United States Patent
Lou et al.

(10) Patent No.: US 11,375,025 B2
(45) Date of Patent: Jun. 28, 2022

(54) COMMUNICATIONS METHOD AND APPARATUS

(71) Applicant: Huawei Technologies Co., Ltd., Shenzhen (CN)

(72) Inventors: Chong Lou, Shanghai (CN); Xing Liu, Shenzhen (CN); Qufang Huang, Shenzhen (CN); Xiaoying Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/216,244

(22) Filed: Mar. 29, 2021

(65) Prior Publication Data
US 2021/0218817 A1 Jul. 15, 2021

Related U.S. Application Data

(63) Continuation of application No. PCT/CN2019/108722, filed on Sep. 27, 2019.

(30) Foreign Application Priority Data

Sep. 29, 2018 (CN) .......................... 201811151716.6

(51) Int. Cl.
G06F 15/173 (2006.01)
H04L 67/141 (2022.01)
H04L 47/70 (2022.01)

(52) U.S. Cl.
CPC ............ *H04L 67/141* (2013.01); *H04L 47/82* (2013.01)

(58) Field of Classification Search
CPC ....... H04L 67/141; H04L 47/82; H04L 29/08; H04L 1/189
(Continued)

(56) References Cited

U.S. PATENT DOCUMENTS 10,805,048 B2 * 10/2020 Kim ...................... H04L 69/324
11,063,704 B2 * 7/2021 Zou ........................ H04W 36/00
(Continued)

FOREIGN PATENT DOCUMENTS

CN 104955064 A 9/2015
CN 107147479 A 9/2017
(Continued)

OTHER PUBLICATIONS

Mitsubishi Electric, "DL PDCP Duplication in CU-DU Split Architecture," 3GPP TSG RAN WG3, Athens, Greece, R3-181363, total 3 pages, 3rd Generation Partnership Project, Valbonne, France (Feb. 26-Mar. 2, 2018).
(Continued)

*Primary Examiner* — Ruolei Zong
(74) *Attorney, Agent, or Firm* — Leydig, Voit & Mayer, Ltd.

(57) ABSTRACT

A communications method and apparatus are provided. The method includes: A first access network device sends a first message to a core network device, where the first message is used to indicate to suspend one or both of a first PDU session and a second PDU session. The first PDU session and the second PDU session are PDU sessions that are established as requested by a same terminal, and are used to transmit a duplicated data packet. According to the method, when a condition for implementing reliable transmission is not met, the core network device can be indicated to suspend the PDU session. In this way, a PDU session does not need to be re-established, and signaling overheads for establishing the PDU session are saved.

12 Claims, 14 Drawing Sheets

(58) Field of Classification Search
USPC .......................................................... 709/227
See application file for complete search history.

(56) References Cited

U.S. PATENT DOCUMENTS

| | | | |
|---|---|---|---|
| 2014/0321263 | A1 | 10/2014 | Wu |
| 2017/0339609 | A1 | 11/2017 | Youn et al. |
| 2019/0124181 | A1* | 4/2019 | Park .................. H04W 74/0833 |
| 2019/0253924 | A1* | 8/2019 | Kim .................. H04W 28/0278 |
| 2020/0084682 | A1* | 3/2020 | Wang .................... H04W 28/18 |
| 2020/0107213 | A1* | 4/2020 | Park .................... H04L 12/1407 |
| 2020/0137790 | A1* | 4/2020 | Tang ................. H04W 72/1263 |
| 2020/0170072 | A1* | 5/2020 | Xiao .......................... H04L 1/08 |
| 2020/0359397 | A1* | 11/2020 | Liu .......................... H04L 29/08 |
| 2021/0084713 | A1* | 3/2021 | Miklos .................. H04W 76/12 |

FOREIGN PATENT DOCUMENTS

| | | |
|---|---|---|
| CN | 108347727 A | 7/2018 |
| WO | 2018131984 A1 | 7/2018 |

OTHER PUBLICATIONS

ZTE, "Consideration on fast duplication activation and deactivation over F1," 3GPP TSG RAN WG3 NR ADHOC, Sophia Antipolis, France, R3-180135, total 6 pages, 3rd Generation Partnership Project, Valbonne, France (Jan. 22-26, 2018).

"3rd Generation Partnership Project; Technical Specification Group Radio Access Network; NG-RAN; NG Application Protocol (NGAP) (Release 15)," 3GPP TS 38.413 V15.1.0, total 295 pages, 3rd Generation Partnership Project, Valbonne, France (Sep. 2018).

"3rd Generation Partnership Project; Technical Specification Group Services and System Aspects; Study on enhancement of Ultra-Reliable Low-Latency Communication (URLLC) support in the 5G Core network (5GC) (Release 16)," 3GPP TR 23.725 V1.0.0, total 59 pages, 3rd Generation Partnership Project, Valbonne, France (Sep. 2018).

CATT, "Discussion on support of PDCP Duplication," 3GPP TSG-RAN WG3#99bis SanYa, China, R3-181795, total 3 pages, 3rd Generation Partnership Project, Valbonne, France (Apr. 16-20, 2018).

"3rd Generation Partnership Project; Technical Specification Group Services and System Aspects; System Architecture for the 5G System; Stage 2 (Release 15)," 3GPP TS 23.501 V15.3.0, total 226 pages, 3rd Generation Partnership Project, Valbonne, France (Sep. 2018).

"3rd Generation Partnership Project; Technical Specification Group Radio Access Network; NG-RAN; Xn application protocol (XnAP) (Release 15)," 3GPP TS 38.423 V15.1.0, total 263 pages, 3rd Generation Partnership Project, Valbonne, France (Sep. 2018).

EP/19867207.3, Search Report, dated Sep. 7, 2021.

Ericsson, "Clarifications to solution #1 on dual connectivity based user plane redundancy," 3GPP TSG-SA WG2 Meeting #128bis, Sophia Antipolis, France, S2-188904, total 10 pages, 3rd Generation Partnership Project, Valbonne, France (Aug. 20-24, 2018).

ZTE, "Discussion on redundant PDU Sessions in solutionl," 3GPP TSG RAN WG3 NR#104, Reno, Nevada, US, R3-192233, total 5 pages, 3rd Generation Partnership Project, Valbonne, France (May 13-17, 2019).

* cited by examiner

COMMUNICATIONS METHOD AND APPARATUS

CROSS-REFERENCE TO RELATED APPLICATIONS

This application is a continuation of International Application No. PCT/CN2019/108722, filed on Sep. 27, 2019, which claims priority to Chinese Patent Application No. 201811151716.6, filed on Sep. 29, 2018. The disclosures of the aforementioned applications are hereby incorporated by reference in their entireties.

TECHNICAL FIELD

Embodiments of this application relate to the field of communications technologies, and in particular, to a communications method and apparatus.

BACKGROUND

With development of communications technologies, a duplicate transmission scheme for data at a Packet Data Convergence Protocol (PDCP) layer is introduced. Generally, in a duplicate transmission scheme, if a duplicate transmission function at the PDCP layer is configured and activated for a radio bearer (RB), an original data packet generated at the PDCP layer is duplicated so that a same data packet is obtained. The original data packet and the duplicated data packet are then delivered by the PDCP layer to different radio link control (RLC) entities, and are transmitted to a Media Access Control (MAC) layer through different logical channels (LCH).

To ensure reliability of data transmission, the original data packet and the duplicated data packet transmitted to the MAC layer are not transmitted by using a same protocol data unit (PDU), because transmission of another PDU is not affected only if the original data packet and the duplicated data packet are transmitted by using different PDUs. Therefore, after two RLC entities transmit the two data packets to different MAC entities through different LCHs, two PDUs are formed for transmission on different carriers.

To ensure end-to-end reliable transmission between a terminal and a core network device, end-to-end redundancy transmission of data (for example, from the terminal to the core network device) is further introduced in 5th Generation (5G) New Radio (NR) based on the foregoing scheme. Using an example in which the redundancy transmission of data occurs from the terminal to the core network device in a dual connectivity (DC) scenario, the two PDUs formed at the terminal are sent to the core network device by using different base stations. The two base stations are respectively referred to as a master base station and a secondary base station below.

Currently, in the DC scenario, before the terminal performs the redundancy transmission of data with the core network device by using the two different base stations, a PDU session needs to be established by the terminal, the master base station, and the core network device, and another PDU session needs to be established by the terminal, the secondary base station, and the core network device. Therefore, the original data packet and the duplicated data packet are transmitted by using the two PDU sessions respectively. However, in the conventional technology, there may be a case in which a terminal is unable to connect to the two base stations, and further research is required about how to handle this case.

SUMMARY

Embodiments of this application provide a communications method and apparatus to optimize a processing process of a base station already connected to a terminal and of a core network device when the terminal is unable to connect to two base stations in a DC scenario.

According to a first aspect, an embodiment of this application provides a communication method. The method may be performed by a first access network device or a communications apparatus (for example, a chip system) that supports the first access network device in implementing the method. This application is described by using an example in which the first access network device performs the method. In the method, the first access network device sends a first message to the core network device. The first message is used to indicate to suspend one or both of a first PDU session and a second PDU session. The first PDU session and the second PDU session are PDU sessions that are established as requested by a same terminal. The first PDU session and the second PDU session are used to transmit a duplicated data packet. The first access network device may further send activation information to the core network device. The activation information is used to activate the suspended PDU session.

According to a second aspect, an embodiment of this application provides a communication method. The method may be performed by a core network device or a communications apparatus (for example, a chip system) that supports the core network device in implementing the method. This application is described by using an example in which the core network device performs the method. In the method, the core network device receives a first message from a first access network device. The first message is used to indicate to suspend one or both of a first PDU session and a second PDU session. The first PDU session and the second PDU session are PDU sessions that are established as requested by a same terminal. The first PDU session and the second PDU session are used to transmit a duplicated data packet. The core network device suspends one or both of the first PDU session and the second PDU session based on the received first message.

According to a third aspect, this application provides a communications apparatus, including units or means (means) configured to perform the steps in the first aspect or the second aspect.

According to a fourth aspect, this application provides a communications apparatus, including at least one processor and a memory. The at least one processor is configured to perform the method provided in the first aspect or the second aspect.

According to a fifth aspect, this application provides a communications apparatus, including at least one processor and an interface circuit. The at least one processor is configured to perform the method provided in the first aspect or the second aspect.

According to a sixth aspect, this application provides a communication program. When the program is executed by a processor, the processor is configured to perform the method in the first aspect or the second aspect.

According to a seventh aspect, a program product is provided, for example, a computer-readable storage medium, including the program in the sixth aspect.

It can be learned that, in the foregoing aspects, the first access network device can indicate, when a condition for implementing reliable transmission is not met (for example, the terminal that requests to establish the first PDU session and the second PDU session is unable to connect to another access network device other than the first access network device), the core network device to suspend the PDU session. When the condition for implementing reliable transmission is subsequently met, the core network device may be indicated to activate the suspended PDU session. In this way, a PDU session does not need to be re-established, and signaling overheads for establishing the PDU session are saved.

In a possible design, after receiving the activation information from the first access network device, the core network device may activate the suspended PDU session based on the activation information. According to this method, a PDU session does not need to be re-established, and the signaling overheads for establishing the PDU session are saved.

In a possible design, before receiving the first message from the first access network device, the core network device may further receive a first session establishment request message from the terminal. The first session establishment request message includes a first identifier used to identify the first PDU session. The first session establishment request message is used to request to establish the first PDU session. The core network device determines, based on the first session establishment request message, to establish the first PDU session. In addition, the core network device may further receive, from the terminal, a second identifier used to identify the second PDU session, and determine, based on the second identifier, to establish the second PDU session. After determining to establish the first PDU session and the second PDU session, the core network device may further send a second message to the first access network device. The second message includes the first identifier and the second identifier. The second message is used to request to establish the first PDU session and the second PDU session. Before sending the first message to the core network device, the first access network device receives the second message from the core network device.

A message carrying the second identifier and sent to the core network device is not limited in this application. In a possible design, the first session establishment request message further includes the second identifier. In another possible design, the second identifier is carried in a second session establishment request message. The second session establishment request message is used to request to establish the second PDU session.

In a possible design, the second message further includes an association indication. The association indication is used to indicate that the first PDU session is associated with the second PDU session.

In a possible design, after receiving the second message, the first access network device determines, based on the second message, to establish the first PDU session at the first access network device, and establishes the second PDU session at the second access network device. In this design, when determining that there is no second access network device that can establish the second PDU session, the first access network device sends the first message to the core network device.

In a possible design, when determining that there is a second access network device that can establish the second PDU session, the first access network device sends the activation information to the core network device.

In a possible design, the first access network device may further send deactivation information to the core network device. The deactivation information is used to indicate to deactivate one or both of the first PDU session and the second PDU session.

In a possible design, after receiving the deactivation information from the first access network device, the core network device may further deactivate one or both of the first PDU session and the second PDU session based on the deactivation information.

In a possible design, the deactivation information includes an identifier of a to-be-deactivated PDU session.

In a possible design, the deactivation information includes an indication information element. The indication information element is used to indicate to deactivate one or both of the first PDU session and the second PDU session.

In a possible design, the first message includes a first information element and/or a second information element. The first information element is used to indicate to suspend the first PDU session and/or the second PDU session. The second information element is used to indicate a suspension cause.

In a possible design, the activation information includes an identifier of a to-be-activated PDU session.

In a possible design, the activation information includes an indication information element. The indication information element is used to indicate to activate one or both of the first PDU session and the second PDU session.

DESCRIPTION OF EMBODIMENTS

Figure 1:
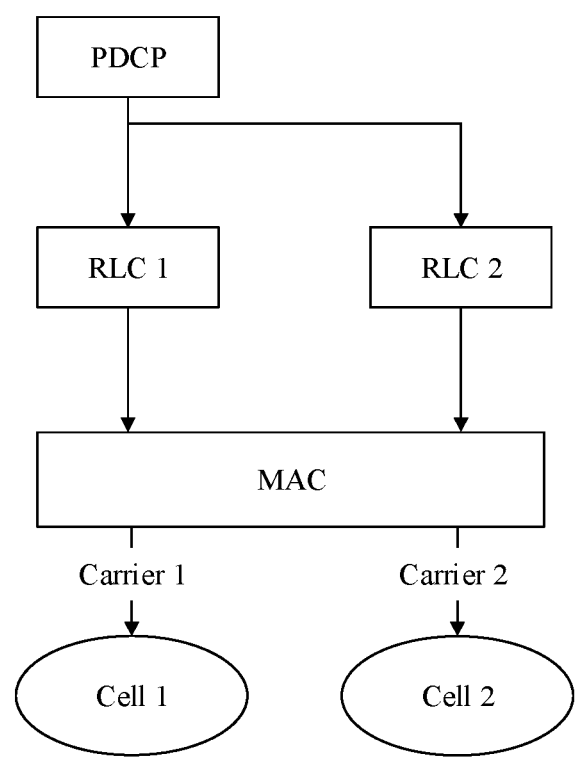
FIG. 1 is a schematic flowchart of implementing a duplicate transmission function at a PDCP layer by a terminal.

To make the objectives, technical solutions and advantages of the embodiments of this application clearer, the following further describes the embodiments of this application in detail with reference to the accompanying drawings.

In the following, some terms of the embodiments of this application are described, so as to help a person skilled in the art have a better understanding.

(1) A terminal: a terminal includes a device that provides a user with voice and/or data connectivity, for example, may include a handheld device with a wireless connection function, or a processing device connected to a wireless modem. The terminal may communicate with a core network by using a radio access network (RAN), and exchange voice and/or data with the RAN. The terminal may include user equipment (UE), a wireless terminal, a mobile terminal, a subscriber unit (subscriber unit), a subscriber station (subscriber station), a mobile station (mobile station), a mobile console (mobile), a remote station (remote station), an access point (AP), a remote terminal (remote terminal), an access terminal (access terminal), a user terminal (user terminal), a user agent (user agent), a user device (user device), or the like. For example, the terminal may include a mobile phone (or referred to as a "cellular" phone), a computer with a mobile terminal, a portable, pocket-sized, handheld, in-computer or in-vehicle mobile apparatus, or a smart wearable device. For example, it may include a device such as a personal communication service (PCS) phone, a cordless telephone set, a session initiation protocol (SIP) phone, a wireless local loop (WLL) station, or a personal digital assistant (PDA). The terminal further includes a limited device, such as a device with a lower power consumption, or a device with a limited storage capacity, or a device with a limited computing capability. For example, the terminal includes information sensing devices such as a barcode identification device, a radio frequency identification (RFID) device, a sensor, a Global Positioning System (GPS), or a laser scanner.

As an example instead of a limitation, in this embodiment of this application, the terminal may alternatively be a wearable device. The wearable device may also be referred to as a wearable smart device, and is a collective term for wearable devices developed by intelligently designing everyday wearables based on a wearable technology, for example, glasses, gloves, a watch, clothing, and shoes. The wearable device is a portable device that is directly worn on a human body or integrated into a user's clothing or accessory. A wearable device is more than a hardware device, and can even achieve powerful functions through software support, data interaction, and cloud interaction. In a broad sense, wearable smart devices include functionally complete and large-sized devices capable of implementing complete or partial functions independently of a smartphone, for example, a smart watch or smart glasses, and also include devices dedicated to a type of application function and used with support of such other devices as a smartphone, for example, various smart bands, smart helmets, and smart jewelry for health monitoring.

(2) Network device: a network device may include an access network (AN) device or a core network (CN) device. The access network device may also be referred to as a base station, or an access point (AP), or may be a device in communication with a wireless terminal device by using one or more cells over an air interface in an access network. Currently, some examples of the access network device are: a next-generation NodeB (gNB), a transmission reception point (TRP), an evolved NodeB (eNB), a radio network controller (RNC), a NodeB (NB), a base station controller (BSC), a base transceiver station (BTS), a home base station (such as a home evolved NodeB or a home NodeB, HNB), a baseband unit (BBU), a wireless fidelity (WiFi) access point (AP), or the like. In a network structure, the network device may include a centralized unit (CU) node, a distributed unit (DU) node, or a RAN device including a CU node and a DU node. The core network device may be a mobility management entity (MME) in LTE, or may be a gateway (gateway), or may be a control plane (CP) network function (NF) or a user plane (UP) network function in a 5G network, for example, a common control plane network function (CCNF), a session management network function (SMF), an access and mobility management function (AMF), or the like.

Communication between the RAN device and the terminal complies with a protocol layer structure. For example, a control plane protocol layer structure may include functions of protocol layers such as a radio resource control (RRC) layer, a Packet Data Convergence Protocol (PDCP) layer, a radio link control (RLC) layer, a Media Access Control (MAC) layer, and a physical layer. A user plane protocol layer structure may include the functions of the protocol layers such as the PDCP layer, the RLC layer, the MAC layer, and the physical layer. In an implementation, a Service Data Adaptation Protocol (SDAP) layer may be further included at the PDCP layer.

The RAN device may use one node to implement the functions of the protocol layers such as the radio resource control (RRC) layer, the Packet Data Convergence Protocol (PDCP) layer, the radio link control (RLC) layer, and the Media Access Control (MAC) layer; or, may use a plurality of nodes to implement the functions of the protocol layers. For example, in an evolved structure, the RAN device may include a centralized unit (CU) and a distributed unit (DU). A plurality of DUs may be centrally controlled by one CU. The CU and the DU may be allocated based at the protocol layers of a wireless network. For example, the functions of the PDCP layer and the protocol layers above the PDCP layer are allocated to the CU, and the functions of the protocol layers below the PDCP layer such as the RLC layer and the MAC layer are allocated to the DU.

The allocation at such protocol layers is merely an example. The allocation may also be performed at other protocol layers such as the RLC layer, so that the functions of the RLC layer and the protocol layers above the RLC layer are allocated to the CU and that the functions of the protocol layers below the RLC layer are allocated to the DU. Alternatively, the allocation is performed within a protocol layer. For example, some functions of the RLC layer and the functions of the protocol layers above the RLC layer are allocated to the CU, and remaining functions of the RLC layer and the functions of the protocol layers below the RLC layer are allocated to the DU. In addition, the allocation may also be performed in another manner, for example, based on a delay, so that a function whose processing time needs to meet a delay requirement is allocated to the DU, and a function whose processing time does not need to meet the delay requirement is allocated to the CU.

(3) Dual connectivity (DC): means that a terminal is connected to two base stations concurrently. The two base stations connected to the terminal may be base stations in a same radio access technology. For example, both of the two base stations connected to the terminal are base stations in an LTE system or base stations in an NR system. Alternatively, the two base stations connected to the terminal may be base stations in different radio access technologies. For example, one base station connected to the terminal is a base station in the LTE system, and the other base station connected to the terminal is a base station in an NR system. In this case, the DC is also referred to as multi-radio access technology DC (multi-rat DC). For ease of description, the DCs in different cases are hereinafter collectively referred to as DC.

(4) Carrier aggregation (CA): a CA technology is used to aggregate a plurality of component carriers (CC) to serve one terminal to achieve a wider transmission bandwidth and effectively increase uplink and downlink transmission speeds.

(5) The terms "system" and "network" may be used interchangeably in the embodiments of this application. "A plurality of" means two or more. Therefore, in the embodiments of this application, "a plurality of" may also be understood as "at least two", and "at least two" means two or more. "At least one" may be understood as one or more, for example, one, two, or more. For example, "including at least one" means that one, two, or more are included, without limiting which items are included. For example, if at least one of A, B, or C is included, the included items may be A alone, B alone, C alone, both A and B, both A and C, both B and C, or, all of A, B, and C. Similarly, the phrases such as "at least one type" are also understood in a similar way. The term "and/or" describes an association relationship for describing associated objects and represents that three relationships may exist. For example, A and/or B may represent the following three cases: Only A exists, both A and B exist, or only B exists. In addition, the character "/" usually indicates an "or" relationship between the associated objects unless otherwise specified.

In addition, unless otherwise specified to the contrary, ordinal words such as "first" and "second" mentioned in the embodiments of this application are used to distinguish between a plurality of objects, but are not used to limit a sequence, a time sequence, a priority, or an importance degree of the plurality of objects. For example, the first PDU session and the second PDU session are merely used to distinguish between different PDU sessions, but do not indicate that priorities, importance, or the like of the two PDU sessions are different.

The foregoing describes some concepts related to the embodiments of this application. The following describes technical features related to the embodiments of this application.

In the 5G NR system, to ensure a low latency and high reliability of services such as ultra-reliable and low-latency communication (URLLC), a duplicate (duplication) transmission scheme for data at the PDCP layer is introduced.

The following describes how the duplicate transmission function at the PDCP layer is implemented at a terminal side.

Refer to FIG. 1, which shows a process by which a terminal implements the duplicate transmission function at a PDCP layer. Assuming that the duplicate transmission function at the PDCP layer is configured and activated for a radio bearer (RB), each original data packet generated at the PDCP layer, such as a PDCP protocol data unit (PDU), is duplicated, and then the original data packet and the duplicated data packet are delivered by the PDCP layer to different RLC entities such as RLC 1 and RLC 2 in FIG. 1, and are transmitted to the MAC layer through different LCHs. In the example described here, the data packets are delivered to two RLC entities. Alternatively, a data packet may be duplicated into a plurality of counterparts and transmitted by more than two RLC entities. To ensure reliability of data transmission, the original data packet and the duplicated data packet transmitted to the MAC layer may be transmitted by using different carriers/cells, so as to ensure that the original data packet and the duplicated data packet are transmitted through two independent transmission paths. Because the data packets are transmitted through different transmission paths, loss of the data packet transmitted on one transmission link does not affect transmission of the data packet transmitted on the other transmission link, thereby doubling the reliability. Therefore, after the RLC 1 and the RLC 2 in the terminal transmit the two data packets to the MAC entity through different LCHs, the two data packets are respectively transmitted on different carriers/cells. As shown in FIG. 1, two PDUs are formed and then sent on a carrier 1 and a carrier 2 respectively.

The following uses two RLC entities and a DC scenario as an example to describe how to implement a transmission function at the PDCP layer.

Figure 2:
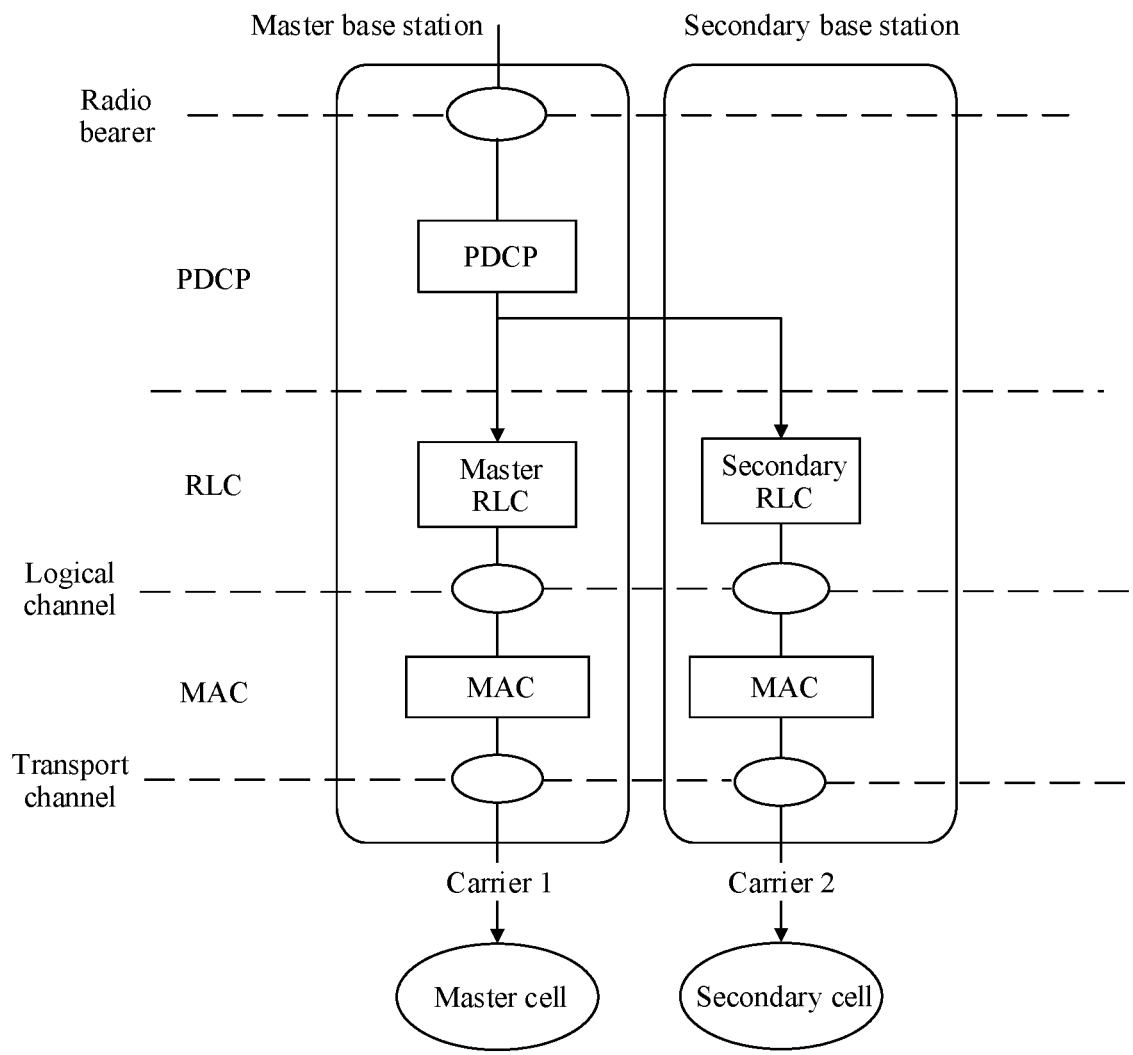
FIG. 2 is a schematic diagram of a network architecture according to an embodiment of this application.

Refer to FIG. 2, which shows a network architecture by which the duplicate transmission function is implemented at the PDCP layer in the DC scenario. With respect to a base station, the DC scenario relates to a master base station and a secondary base station. Network architectures of the master base station and the secondary base station with respect to one radio bearer are shown in FIG. 2. A network architecture of a terminal with respect to the radio bearer includes the network architecture of the master base station and the network architecture of the secondary base station shown in FIG. 2. In other words, with respect to the radio bearer, the terminal includes one PDCP entity, two RLC entities, and two MAC entities. The PDCP entity, the PDCP layer, and the PDCP may be understood as a same concept. Similarly, the RLC entity, the RLC layer, and the RLC may be understood as a same concept, and the MAC entity, the MAC layer, and the MAC may be understood as a same concept. In the DC scenario, one terminal is connected to two base stations concurrently, that is, a master base station and a secondary base station. If the duplicate transmission function at the PDCP layer is configured for a radio bearer, two data packets duplicated at the PDCP layer are transmitted to two different RLC entities, and are transmitted to the MAC entities through different logical channels. Finally, the two data packets are transmitted on different carriers. This process is the same for both the base station and the terminal. A difference is that, for the base station, the PDCP layer in the master base station transmits the original data packet and the duplicated data packet to different RLC entities respectively. The two RLC entities are respectively located in the master base station and the secondary base station. Subsequently, the RCL entity in the master base station transmits the received data packet to the MAC entity in the master base station, and the RCL entity in the secondary base station transmits the received data packet to the MAC entity in the secondary base station. The two MAC entities transmit the data packets by using their respective carriers. For the terminal, the process is the same except that the two RCL entities and the two MAC entities are located in the terminal.

In a 5G NR system, to ensure end-to-end reliable transmission between the terminal and a core network device, end-to-end reliable transmission (also referred to as end-to-end redundancy transmission of data) between the terminal and the core network device is further introduced based on the foregoing scheme.

The following describes duplicate transmission between the terminal and the core network device by using two RLC entities and a DC scenario as an example.

Figure 3:
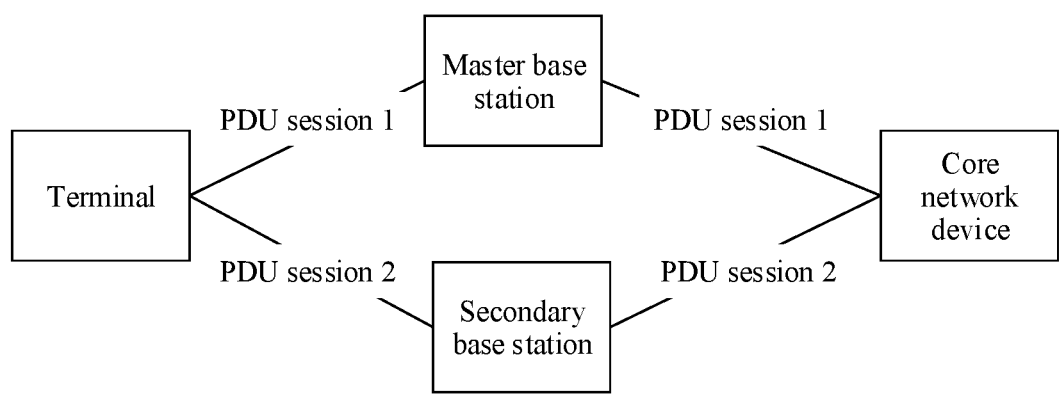
FIG. 3 is a schematic diagram of another network architecture according to an embodiment of this application.

Refer to FIG. 3, which shows a network architecture by which end-to-end reliable transmission is implemented between the terminal and the core network device in a DC scenario. In the DC scenario, using uplink data transmission as an example, the terminal may form two same data packets. In a possible implementation, the terminal generates a duplicated (duplication) data packet by using an existing protocol such as a Frame Replication and Elimination for Reliability (frame replication and elimination for reliability) protocol. In another possible implementation, the terminal may generate two same PDCP PDUs at an access layer such as a PDCP layer. In this application, the same data packet may be referred to as a duplicated (duplication) data packet. This application does not limit how the terminal generates the duplicated data packet. After forming the two duplicated data packets, the terminal may send the two duplicated data packets to the core network device by using a master base station and a secondary base station respectively. Before sending the duplicated data packets to the core network device by using the master base station and the secondary base station, the terminal establishes a PDU session such as a PDU session 1 in FIG. 3 by using the terminal, the master base station, and the core network device, and establishes another PDU session such as a PDU session 2 in FIG. 3 by using the terminal, the secondary base station, and the core network device. Further, the duplicated data packets are transmitted through the two PDU sessions. In this way, the terminal can send the same data packet to the core network device twice, thereby improving data transmission reliability.

As can be learned from the foregoing description, the terminal is connected to two base stations to implement end-to-end reliable transmission between the terminal and the core network device. However, due to mobility of the terminal and a time-varying characteristic of an air interface channel, the terminal may be unable to connect to two base stations in some scenarios. Therefore, further research is required to determine how to implement end-to-end reliable transmission between the terminal and the core network device in a scenario in which the terminal is able to connect to just one base station and in which the core network device has prepared resources for establishing two PDU sessions for the terminal to transmit the duplicated data packets.

In view of this, an embodiment of this application provides a technical solution. In the embodiment of this application, assuming that the terminal is connected to just one master base station, the terminal may initiate establishment of a PDU session with the core network device by using the connected master base station. The core network device may prepare, by using a PDU session establishment request sent by the master base station, a resource used to carry the PDU session. If the master base station determines that the terminal is currently unable to concurrently connect to another secondary base station, the master base station may send a first message to the core network device. The first message is used to indicate to suspend the PDU session that the terminal requests to establish, so that the core network device suspends, based on the first message, the PDU session that the terminal requests to establish. When the master base station subsequently determines that the terminal can be concurrently served by both the master base station and the other secondary base station, the master base station sends activation information to the core network device. The activation information is used to activate the suspended PDU session, so that the core network device activates the suspended PDU session based on the activation information.

The technical solution provided in this embodiment of this application is applicable to a 5G NR system, or applicable to a next-generation mobile communications system or another similar communications system. This is not specifically limited. In addition, the technical solution provided in this embodiment of this application is applicable to a CA scenario, or applicable to a DC scenario, or applicable to another scenario.

Figure 4:
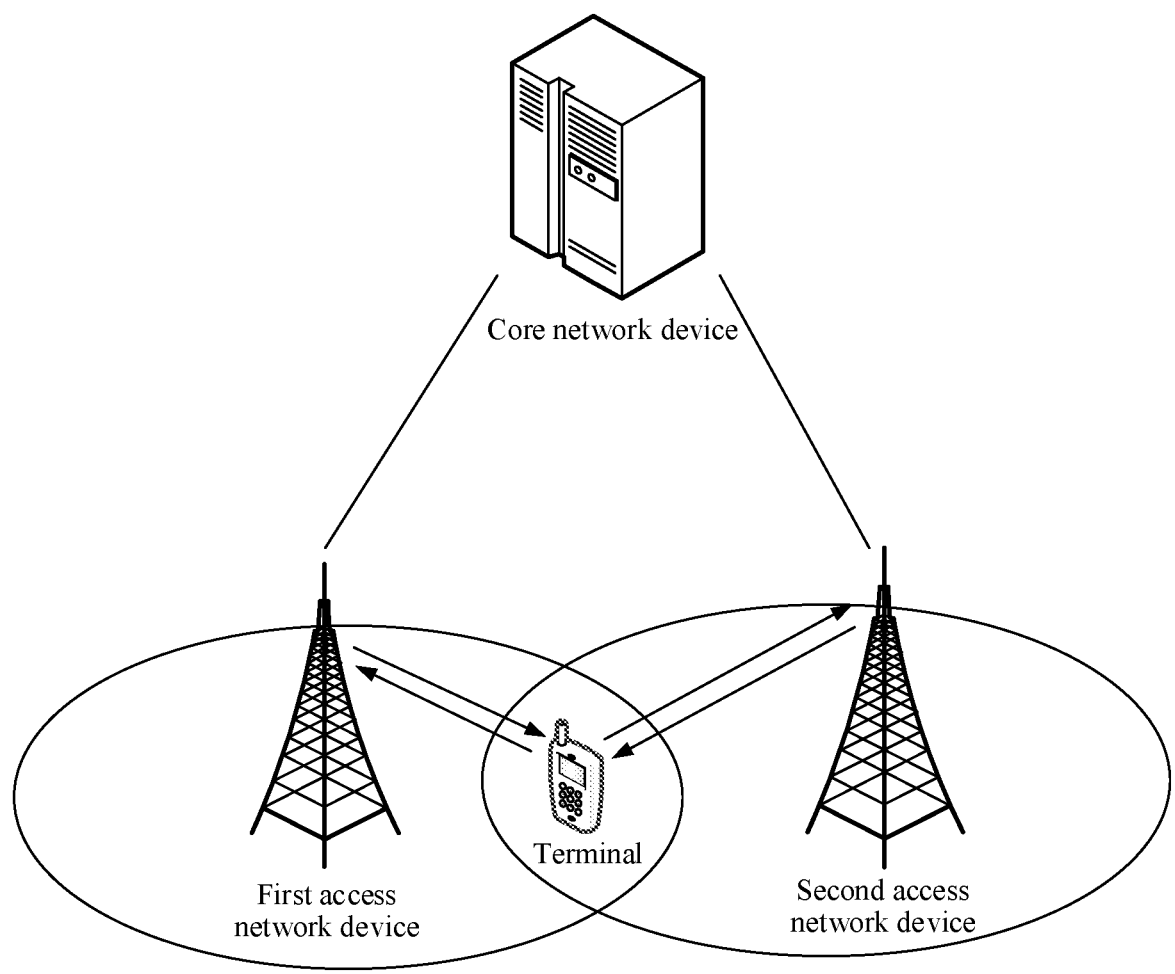
FIG. 4 is a schematic diagram of a communications system according to an embodiment of this application.

Refer to FIG. 4, which is a schematic diagram of a communications system to which an embodiment of this application is applicable. As shown in FIG. 4, a terminal accesses a wireless network to obtain a service from an external network (for example, the Internet) by using the wireless network, or to communicate with another terminal by using the wireless network. The wireless network includes two access network devices and a core network device. The two access network devices are a first access network device and a second access network device. A scenario shown in FIG. 4 may be understood as a DC scenario. The terminal may be concurrently connected to both the first access network device and the second access network device, and the terminal can communicate with both of the two access network devices. The first access network device and the second access network device are configured to connect the terminal to the wireless network. The first access network device may be a master access network device of the terminal, and the second access network device may be a secondary access network device of the terminal. Alternatively, the first access network device is a secondary access network device of the terminal, and the second access network device is a master access network device of the terminal. For example, both access network devices are base stations. In this case, the master access network device is a master base station, and the secondary access network device is a secondary base station. The first access network device may work in an Evolved Universal Mobile Telecommunications System Terrestrial Radio Access (E-UTRA) system, the second access network device may work in an NR system. Alternatively, the first access network device may work in an NR system, and the second access network device may work in an E-UTRA system. Alternatively, for example, both the first access network device and the second access network device work in an NR system, or in an E-UTRA system. The core network device is configured to manage the terminal and provide a gateway for communication with the external network.

For example, the access network devices (the first access network device and the second access network device) in FIG. 4 are base stations. In different systems, the access network devices correspond to different devices. For example, in a fourth generation mobile communications technology (4G) system, an access network device may correspond to an eNB. For another example, in a fifth generation mobile communications technology (5G) system, an access network device may correspond to a gNB.

With reference to accompanying drawings, the following describes the technical solutions provided in the embodiments of this application.

Figure 5:
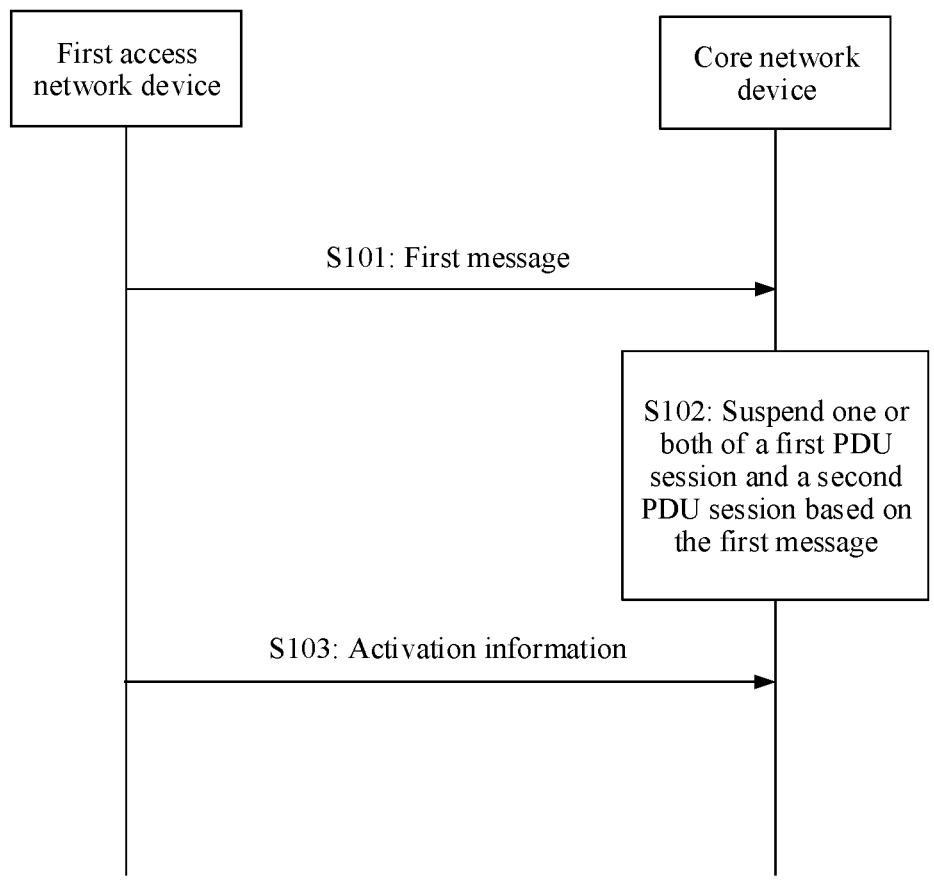
FIG. 5 is a schematic flowchart of a communication method according to an embodiment of this application.

Refer to FIG. 5, which shows a communication method according to an embodiment of this application. The method is applicable to the scenario shown in FIG. 4. If the method is applied to the scenario shown in FIG. 4, a first access network device referred to in the method may be a first access network device in the scenario shown in FIG. 4, a second access network device referred to in the method may be a second access network device in the scenario shown in FIG. 4, and a core network device referred to in the method may be a core network device in the scenario shown in FIG. 4. For example, the first access network device and the second access network device may be base stations, and the core network device may be an MME, an AMF, an SMF, or the like.

Referring to FIG. 5, the communication method may include the following processing process.

S101: The first access network device sends a first message to the core network device. The first message may be used to indicate to suspend one or both of a first PDU session and a second PDU session, or, as understood in a different way, to suspend the first PDU session and/or the second PDU session. The first PDU session and the second PDU session may be PDU sessions that a same terminal requests to establish. The first PDU session and the second PDU session are used to transmit a duplicated data packet. The first PDU session and the second PDU session may be understood as PDU sessions that are a duplicate or redundancy of each other. For ease of description in this application, the PDU sessions that are a duplicate or redundancy of each other are collectively referred to as duplicated PDU sessions.

Establishment of the first PDU session and the second PDU session may be proactively initiated by a same terminal, or may be passively initiated by a same terminal. When the same terminal passively initiates establishment of the first PDU session and the second PDU session, before initiating establishment of the PDU session, the terminal may receive a trigger message sent by a network device. The trigger message may include an application indication. The application indication is used to indicate, to the network device, an application that expects the terminal to send a PDU session establishment request. The terminal may trigger a PDU session establishment process based on the trigger message.

In this embodiment of this application, the terminal initiating establishment of the first PDU session and the second PDU session may be a terminal accessing the first access network device, or may be understood as a terminal served by the first access network device. Unless otherwise specified, a terminal hereinafter referred to in this application means such a terminal.

In this embodiment of this application, the duplicated data packet may be a data packet that carries same content. Using uplink transmission as an example in which a terminal sends a data packet to a network device (such as a core network device or a gateway), assuming that the data packet that the terminal needs to send to the network device is a first data packet, the terminal duplicates the first data packet to obtain a second data packet that is the same as the first data packet, and then sends the first data packet and the second data packet to the network device. In this application, the first data packet and the second data packet are collectively referred to as duplicated data packets. Correspondingly, downlink transmission is similar to uplink transmission except that the duplicated data packets are generated at the network device. A quantity of first data packets is not limited in this embodiment of this application. There may be one or more first data packets. Understandably, because the second data packet is a data packet obtained by duplicating the first data packet, when the quantity of the first data packet is one, a corresponding quantity of the second data packet is also one; and, when the quantity of the first data packets is plural, a corresponding quantity of the second data packets is also plural.

Using a DC scenario as an example, the first PDU session in this application may be a PDU session that the terminal requests to establish with the core network device by using the first access network device. For example, the first PDU session may be a PDU session 1 in FIG. 3. In this case, the first access network device may be a master base station in FIG. 3. The second PDU session may be a PDU session that the terminal requests to establish with the core network device by using another access network device different from the first access network device. For example, the second PDU session may be a PDU session 2 in FIG. 3. In this case, the other access network device may be a secondary base station in FIG. 3. This application is described by using an example in which the first PDU session is a PDU session that the terminal requests to establish with the core network device by using the first access network device, and in which the second PDU session is a PDU session that the terminal requests to establish with the core network device by using another access network device.

In this embodiment of this application, the first message may be a PDU session resource establishment response (PDU session resource setup response) message, or a dedicated message used to suspend a PDU session. For example, the dedicated message may be a PDU session suspension message.

Optionally, the first message may carry an identifier of the first PDU session and/or an identifier of the second PDU session. For example, if the first message is used to indicate to suspend the first PDU session and the second PDU session, the first message may carry the identifier of the first PDU session and the identifier of the second PDU session. For another example, if the first message is used to indicate to suspend the first PDU session, the first message may carry the identifier of the first PDU session. For another example, if the first message is used to indicate to suspend the second PDU session, the first message may carry the identifier of the second PDU session.

The identifier of the first PDU session is used to uniquely identify the first PDU session, and the identifier of the second PDU session is used to uniquely identify the second PDU session. In this embodiment of this application, for ease of description, the identifier of the first PDU session is referred to as a first identifier, and the identifier of the second PDU session is referred to as a second identifier.

Optionally, the first message may explicitly or implicitly indicate to suspend the first PDU session and/or the second PDU session. When the first message explicitly indicates to suspend the first PDU session and/or the second PDU session, the first message may carry a first information element (also referred to as indication information). The first information element is used to indicate the core network device to suspend the first PDU session and/or the second PDU session. Implementations of explicit and implicit indication are described in detail below, details of which are omitted here.

Optionally, the first access network device may further add a second information element to the first message. The second information element may be used to indicate a suspension cause. An example of the suspension cause is: the first access network device is unable to prepare for DC establishment for the terminal initiating establishment of the first PDU session and the second PDU session. Another example of the suspension cause is resource shortage whereby the first access network device or the second access network device is unable to provide a resource required for establishing the first PDU session or the second PDU session.

In a possible implementation, the first message may be further used to indicate to temporarily reject the first PDU session and/or the second PDU session. Alternatively, as understood in a different way, the first message is used to notify the core network device that a resource used to carry the first PDU session and/or the second PDU session temporarily does not need to be released. Alternatively, as understood in a different way, the first message is used to notify the core network device that the first PDU session and/or the second PDU session temporarily do not need to be released. The resource used to carry the first PDU session and/or the second PDU session may be, for example, a core network tunnel (tunnel) used to carry the first PDU session and/or the second PDU session and a reserved resource. In this example, after receiving the first message, the core network device may temporarily retain, for future use, the established core network tunnel (tunnel) used to carry the first PDU session and/or the second PDU session and the reserved resource. In this implementation, the first message may be a PDU session resource establishment response (PDU session resource setup response) message, or may be a dedicated message used to indicate to temporarily reject establishment of the first PDU session and/or the second PDU session. For example, the dedicated message may be a PDU session rejection message. In this implementation, the first information element may be used to indicate to temporarily reject the first PDU session and/or the second PDU session. The second information element may be used to indicate a rejection cause. The rejection cause may include a cause for temporary inability to establish the first PDU session and/or the second PDU session. For example, the first access network device is unable to prepare for DC establishment for the terminal initiating establishment of the first PDU session and the second PDU session. For another example, the rejection cause may further include resource shortage whereby the first access network device or the second access network device is unable to provide a resource required for establishing the first PDU session or the second PDU session.

Optionally, in the foregoing possible implementation, the first message may carry a first identifier and/or a second identifier. For example, if the first message is used to indicate to temporarily reject the first PDU session and the second PDU session, the first message may carry the first identifier and the second identifier. For another example, if the first message is used to indicate to temporarily reject the first PDU session, the first message may carry the first identifier. For another example, if the first message is used to indicate to temporarily reject the second PDU session, the first message may carry the second identifier.

In this application, temporary rejection may be understood as rejection within a preset time. The preset time may be understood as a time from a first moment to a second moment. The first moment may be a moment at which the first access network device sends the first message to the core network device, and the second moment may be a moment at which the first access network device sends the activation information to the core network device (S103).

Step S101 in this embodiment of this application may be understood as corresponding to the following three solutions.

First solution: The first access network device sends the first message to the core network device, where the first message is used to indicate to suspend the first PDU session and the second PDU session.

Second solution: The first access network device sends the first message to the core network device, where the first message is used to indicate to suspend the first PDU session.

Third solution: The first access network device sends the first message to the core network device, where the first message is used to indicate to suspend the second PDU session.

All the foregoing three solutions are applicable to a scenario in which the core network device has prepared a resource for establishing the first PDU session and the second PDU session. This scenario is hereinafter used as an example in this embodiment of this application.

In this embodiment of this application, the first access network device may send the first message to the core network device when determining that one or more of the following suspension conditions are met. Understandably, when the first message is used to indicate to temporarily reject the first PDU session and/or the second PDU session, the suspension condition may also be referred to as a temporary rejection condition. A name is not limited in this application.

Suspension condition 1: The first access network device determines that there is no second access network device that can establish the second PDU session. The second access network device and the first access network device are different access network devices. Unless otherwise specified in this application, the second access network device is an access network device different from the first access network device. This also applies to the second access network device that appears hereinafter, and will not be reiterated.

The first access network device may determine, in the following manner, that there is no second access network device that can establish the second PDU session.

In a possible implementation, the first access network device determines, based on a measurement report reported by the terminal initiating establishment of the first PDU session and the second PDU session, that there is no second access network device that can provide a radio resource for the terminal, for example, no second access network device whose channel status meets a communications requirement. In this way, the first access network device may determine that there is no second access network device that can establish the second PDU session for the terminal.

In another possible implementation, the first access network device determines, based on the obtained load statuses of a plurality of access network devices, that there is no second access network device that can provide radio resources for the terminal initiating establishment of the first PDU session and the second PDU session. For example, as learned by the first access network device, the plurality of access network devices are overloaded. In this way, the first access network device may determine that there is no second access network device that can establish the second PDU session for the terminal.

Suspension condition 2: The first access network device determines that the terminal that initiates establishment of the first PDU session and the second PDU session is unable to connect to the second access network device. The terminal being unable to connect to the second access network device may also be understood as the terminal being unable to access the second access network device.

Suspension condition 3: The first access network device determines inability to establish DC for the terminal that initiates establishment of the first PDU session and the second PDU session. The inability of the first access network device to establish the DC for the terminal may be understood as inability of the first access network device to add the second access network device to concurrently serve the terminal.

The first access network device may determine, in the following manner, the inability to establish the DC for the terminal.

In a possible implementation, the first access network device sends a request for adding a second access network device, so that the second access network device is requested to provide radio resources for the terminal initiating establishment of the first PDU session and the second PDU session. A radio resource management (RRM) entity of the second access network device rejects the request sent by the first access network device and intended to add the second access network device. Therefore, the first access network device determines inability to establish the DC for the terminal.

Suspension condition 4: The first access network device determines, based on a QoS parameter corresponding to a quality of service (QoS) flow of the first PDU session and/or the second PDU session, for example, a reliability requirement, that the reliability requirement is met by one PDU session (the first PDU session or the second PDU session) established on just one access network device (the first access network device or the second access network device), without a need to establish a PDU session on the first access network device and the second access network device separately.

S102: After receiving the first message sent by the first access network device, the core network device suspends one or both of the first PDU session and the second PDU session based on the first message. This may be understood as suspending the first PDU session and/or the second PDU session.

Corresponding to the three solutions provided in step S101, the following three solutions are provided in step S102:

First solution: The core network device suspends the first PDU session and the second PDU session based on the first message.

Second solution: The core network device suspends the first PDU session based on the first message.

Third solution: The core network device suspends the second PDU session based on the first message.

When the first solution is implemented in step S101, the corresponding first solution is also implemented in step S102. When the second solution is implemented in step S101, the corresponding second solution is also implemented in step S102. When the third solution is implemented in step S101, the corresponding third solution is also implemented in step S102.

The following describes a meaning of suspending by using suspension of the first PDU session and the second PDU session as an example. Suspending the first PDU session and the second PDU session may mean no release of a resource prepared for establishing/bearing the first PDU session and the second PDU session.

S103: The first access network device sends activation information to the core network device. The activation information is used to activate the suspended first PDU session and/or second PDU session. The being used to activate the suspended first PDU session and/or second PDU session may also be understood as being used to resume the suspended first PDU session and/or second PDU session. The activated/resumed first PDU session and/or second PDU session may be understood as readiness for being used to transmit a data packet.

In a possible implementation, after receiving the activation information sent by the first access network device, the core network device may further send an acknowledgment message to the first access network device, to acknowledge that the activation information is received.

The activation information may be carried in an existing message, for example, may be carried in a PDU session resource modify indication (PDU session resource modify indication) message, or may be carried in a newly added dedicated message, for example, may be carried in a newly added PDU session activation message or a PDU session resumption message.

Optionally, the activation information may include a first identifier and/or a second identifier. For example, if the activation information is used to activate the suspended first PDU session and second PDU session, the activation information may include a first identifier and a second identifier. For another example, if the activation information is used to activate the suspended first PDU session, the activation information may include the first identifier. For another example, if the activation information is used to activate the suspended second PDU session, the activation information may include the second identifier.

Optionally, the activation information may further include an indication information element. The indication information element may indicate to activate the first PDU session and/or the second PDU session.

In this embodiment of this application, corresponding to the three solutions provided in steps S101 and S102, the following three solutions are provided in step S103.

First solution: The first access network device sends activation information to the core network device. The activation information is used to activate the suspended first PDU session and second PDU session. This solution is applicable to a scenario in which a reliable transmission requirement between the terminal and the core network device is not met by transmission of the data packet by using the first PDU session alone or the second PDU session alone.

Second solution: The first access network device sends activation information to the core network device. The activation information is used to activate the suspended first PDU session. This solution is applicable to a scenario in which the reliable transmission requirement between the terminal and the core network device is not met by transmission of the data packet by using the second PDU session alone.

Third solution: The first access network device sends activation information to the core network device. The activation information is used to activate the suspended second PDU session. This solution is applicable to a scenario in which the reliable transmission requirement between the terminal and the core network device is not met by transmission of the data packet by using the first PDU session alone.

When the first solution is implemented in steps S101 and S102, the corresponding first solution is implemented in step S103. When the second solution is implemented in steps S101 and S102, the corresponding second solution is implemented in step S103. When the third solution is implemented in steps S101 and S102, the corresponding third solution is implemented in step S103.

In an implementation, the first access network device establishes the first PDU session, and sends a first message to the core network device, where the first message is used to indicate to suspend the second PDU session. In this case, the first access network device does not establish the second PDU session.

In an implementation, the first access network device sends the first message to the core network device, where the first message is used to indicate to suspend the first PDU session and the second PDU session. In this case, the first access network device may skip establishing the first PDU session and the second PDU session. Then, the first access network device may activate merely the first PDU session or the second PDU session.

In this embodiment of this application, the first access network device may send the activation information to the core network device when determining that one or more of the following activation conditions are met. The activation condition is also referred to as information about meeting a condition for establishing the second PDU session, and the second access network device referred to hereinafter is a generic term instead of a specific access network device. An access network device that does not meet the activation condition may be the same as or different from an access network device that meets the activation condition. For example, when the first access network device receives the second message, there is no access network device that meets the condition for establishing the second PDU session. However, as load or channel quality of the access network device changes, when an access network device that meets the condition for establishing the second PDU session appears, the first access network device may send the activation information to the core network device.

Activation condition 1: The first access network device determines that there is a second access network device that can establish the second PDU session.

The first access network device may determine, in the following manner, that there is a second access network device that can establish the second PDU session.

In a possible implementation, the first access network device determines, based on a measurement report reported by the terminal initiating establishment of the first PDU session and the second PDU session, that there is a second access network device that can provide a radio resource for the terminal, for example, a second access network device whose channel status meets a communications requirement. In this way, the first access network device may determine that there is a second access network device that can establish the second PDU session for the terminal.

In another possible implementation, the first access network device determines, based on the obtained load statuses of a plurality of access network devices, that there is a second access network device that can provide radio resources for the terminal initiating establishment of the first PDU session and the second PDU session. For example, as learned by the first access network device, the plurality of access network devices are light-loaded. In this way, the first access network device may determine that there is a second access network device that can establish the second PDU session for the terminal.

Activation condition 2: The first access network device determines that the terminal that initiates establishment of the first PDU session and the second PDU session is able to connect to the second access network device.

Activation condition 3: The first access network device determines ability to establish DC for the terminal that initiates establishment of the first PDU session and the second PDU session. The ability of the first access network device to establish the DC for the terminal may be understood as ability of the first access network device to add the second access network device to concurrently serve the terminal.

The first access network device may determine, in the following manner, the ability to establish the DC for the terminal.

In a possible implementation, the first access network device sends a request for adding a second access network device, so that the second access network device is requested to provide radio resources for the terminal that initiates establishment of the first PDU session and the second PDU session. The first access network device receives an acknowledgment message sent by the second access network device. The acknowledgment message is used to indicate that the second access network device is ready to provide the radio resources for the terminal. In this way, the first access network device may determine that the DC can be established for the terminal.

Activation condition 4: Based on a QoS parameter corresponding to a quality of service (QoS) flow of the first PDU session and/or the second PDU session, for example, a reliability requirement, the first access network device determines that the reliability requirement is not met until a PDU session is established on the first access network device and the second access network device separately (for example, until a first PDU session is established on the first access network device and a second PDU session is established on the second access network device).

Figure 6A:
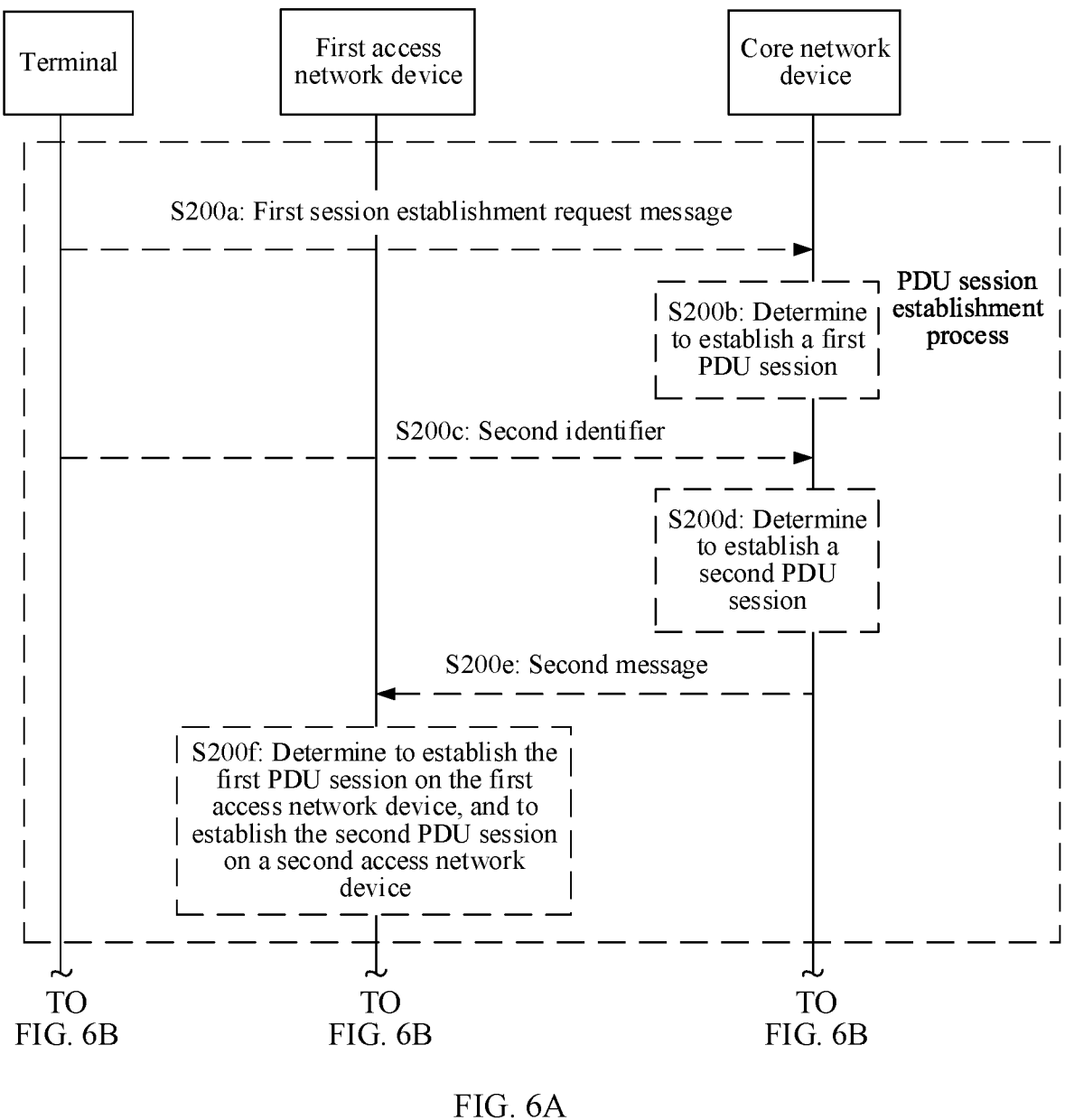
FIG. 6A and FIG. 6B are a schematic flowchart of another communication method according to an embodiment of this application.
Figure 6B:
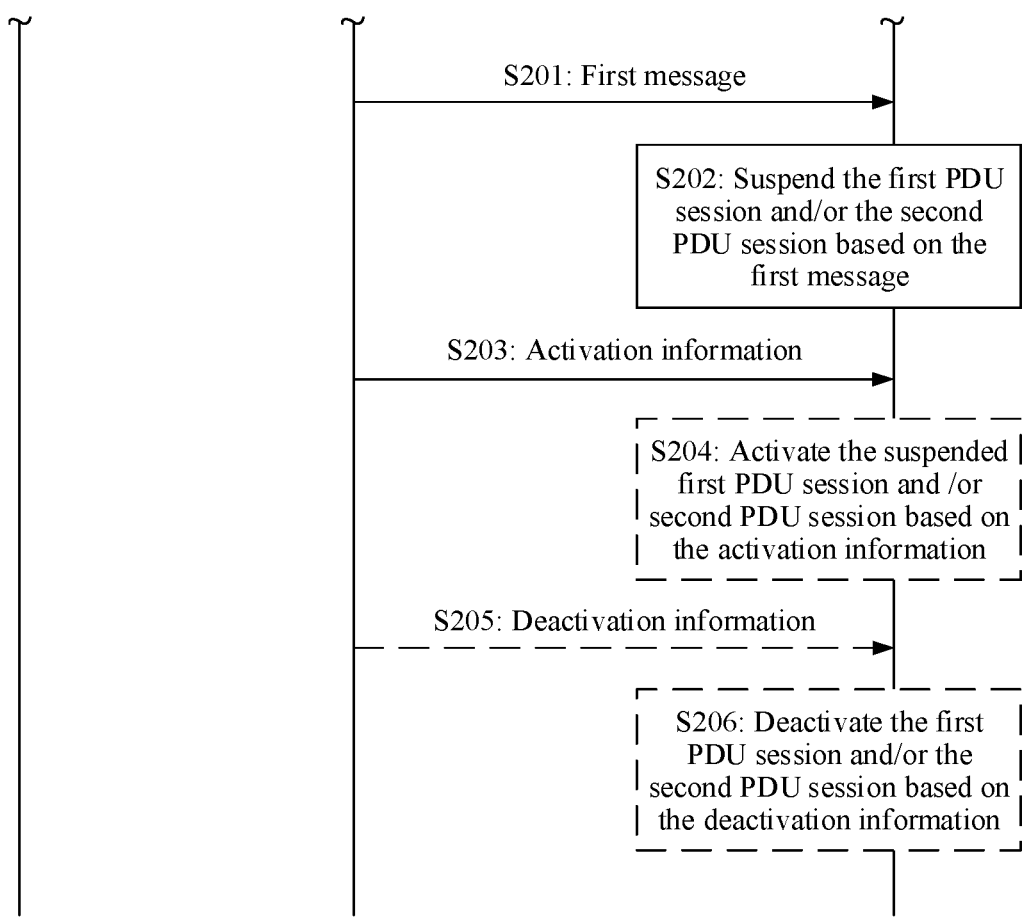

With reference to the process shown in FIG. 5, the following describes in more detail the communication method provided in this embodiment of this application. As shown in FIG. 6A and FIG. 6B, the process of the communication method is described below.

For steps S201 to S203, refer to the descriptions of steps S101 to S103, and details are omitted here.

In a possible implementation, after receiving the activation information sent by the first access network device, the core network device may activate the suspended first PDU session and/or second PDU session based on the activation information. Refer to step S204 in FIG. 6B. For example, if the activation information is used to activate the suspended first PDU session, the core network device may activate the suspended first PDU session based on the activation information. For example, if the activation information is used to activate the suspended first PDU session and second PDU session, the core network device may activate the suspended first PDU session and second PDU session based on the activation information.

In this embodiment of this application, after being activated, the suspended first PDU session and/or second PDU session may be used to transmit a data packet.

In this embodiment of this application, before the PDU session suspension process is performed, a PDU session establishment process may be further performed. The following describes a PDU session establishment process. Refer to steps S200*a* to S200*f* in FIG. 6A.

S200*a*: The core network device receives a first session establishment request message from a terminal. The first session establishment request message includes a first identifier used to identify a first PDU session, and the first session establishment request message is used to request to establish the first PDU session.

The core network device may receive the first session establishment request message from the terminal by using the first access network device. The first session establishment request message may be a non-access stratum (NAS) message.

S200*b*: The core network device determines, based on the first session establishment request message sent by the terminal, to establish the first PDU session.

S200*c*: The core network device may further receive a second identifier from the terminal.

The core network device may receive the second identifier from the terminal by using the first access network device.

In this application, the second identifier may be carried in different messages for sending. The following describes two implementations of sending the second identifier by the terminal.

In a possible implementation, the second identifier is carried in the first session establishment request message for sending.

In another possible implementation, the second identifier is carried in a second session establishment request message for sending. The second session establishment request message is used to request to establish a second PDU session.

Optionally, the first session establishment request message may further include an association indication. The association indication is used to indicate that the first PDU session is associated with the second PDU session. The association between the first PDU session and the second PDU session may mean that the first PDU session and the second PDU session are used to transmit duplicated data packets. For ease of description, a PDU session used to transmit a duplicated data packet is hereinafter referred to as a duplicated or redundant PDU session. If the second identifier is carried in the second session establishment request message, the association indication may include a first association identifier. The first association identifier may indicate that the first PDU session is the 1st PDU session in the duplicated PDU sessions. If the second identifier is carried in the first session establishment request message, the association indication may include a first association identifier and a second association identifier. The first association identifier may indicate that the first PDU session is the 1st PDU session in the duplicated PDU sessions, and the second association identifier may indicate that the second PDU session is the 2nd PDU session in the duplicated PDU sessions, or indicate that the 2nd PDU session is established on the second access network device.

Optionally, the second session establishment request message may further include an association indication, the association indication may include a second association identifier, and the second association identifier may indicate that the second PDU session is the 2nd PDU session in the duplicated PDU sessions. When the second identifier is carried in the first session establishment request message, step S200a and step S200c in FIG. 6A may be combined into one step.

S200d: The core network device determines, based on the received second identifier, to establish the second PDU session.

S200e: After determining to establish the first PDU session and the second PDU session, the core network device may send a second message to the first access network device. The second message includes the first identifier and the second identifier. The second message is used to request to establish the first PDU session and the second PDU session.

Optionally, the second message may further include an association indication. The association indication is used to indicate that the first PDU session is associated with the second PDU session. The association between the first PDU session and the second PDU session may mean that the first PDU session and the second PDU session are used to transmit duplicated data packets. The association indication may include a first association identifier and a second association identifier. The first association identifier may indicate that the first PDU session is the 1st PDU session in the duplicated PDU sessions, and the second association identifier may indicate that the second PDU session is the 2nd PDU session in the duplicated PDU sessions.

Understandably, if the first session establishment request message or the second session establishment request message includes no association indication, the core network device may determine, based on a pre-agreed rule, whether the first PDU session and the second PDU session are duplicated PDU sessions. Certainly, the core network device may also determine, based on the pre-agreed rule, which one of the first PDU session or the second PDU session is the 1st PDU session in the duplicated PDU sessions, and which one is the 2nd PDU session in the duplicated PDU sessions.

Optionally, the second message may further include a restrictive indication. The restrictive indication is used to indicate a restrictive relationship by which the first PDU session can be established on a specified access network device and the second PDU session can be established on another specified access network device. The restrictive indication may include a first restrictive identifier. The first restrictive identifier may indicate a restriction by which the first PDU session can be established on the first access network device alone, or can be established on the second access network device alone, or can be established on either the first access network device or the second access network device. The restrictive indication may further include a second restrictive identifier. The second restrictive identifier may indicate a restriction by which the second PDU session can be established on the first access network device alone, or can be established on the second access network device alone, or can be established on either the first access network device or the second access network device. Understandably, the restrictive relationship may be represented by an association indication. In this case, the restrictive indication may be omitted. Instead, based on the association indication, the restrictive relationship is implicitly determined so that the first PDU session can be established on a specified access network device and that the second PDU session can be established on another specified access network device. For example, if the association indication includes a first association identifier and a second association identifier, the first association identifier indicates that the first PDU session is the 1st PDU session in the duplicated PDU sessions, and the second association identifier indicates that the second PDU session is the 2nd PDU session in the duplicated PDU sessions, then the 1st PDU session in the duplicated PDU sessions may represent a restriction by which this PDU session can be established on the first access network device, and the 2nd PDU session in the duplicated PDU sessions may represent a restriction by which this PDU session can be established on the second access network device.

In a possible implementation, the sending the first identifier and the second identifier to the first access network device separately by the core network device may also be understood as initiating, by the core network device, a first PDU session establishment process and a second PDU session establishment process toward the first access network device separately. In this implementation, the terminal may sequentially send a first session establishment request message and a second session establishment request message to the core network device, to separately request to establish the first PDU session and the second PDU session. After the core network device determines, based on the first session establishment request message and the second session establishment request message separately, to establish the first PDU session and the second PDU session, the core network device sequentially sends a third message and a fourth message to the first access network device. The third message may carry a first identifier, and the fourth message may carry a second identifier. The third message is used to request to establish the first PDU session, and the fourth message is used to request to establish the second PDU session. Optionally, in this implementation, the third message may further carry a first indication (also referred to as a first association identifier), used to indicate that the first PDU session identified by the first identifier is the 1st PDU session in the duplicated PDU sessions. The fourth message may further carry a second indication (also referred to as a second association identifier), used to indicate that the second PDU session identified by the second identifier is the 2nd PDU session in the duplicated PDU sessions.

S200f: The first access network device determines, based on the second message, to establish the first PDU session on the first access network device, and to establish the second PDU session on the second access network device. As understood in a different way, the first access network device and the second access network device establish an end-to-end duplicated or redundant PDU session.

In a possible implementation, after step S200e is performed, the first access network device determines, based on the second message, to establish the first PDU session and the second PDU session on the first access network device. Alternatively, after step S200e is performed, the first access network device determines, based on the second message, to establish the first PDU session and the second PDU session on the second access network device. In this implementation, redundancy transmission for the first PDU session and the second PDU session may be provided on the first access network device or the second access network device by using CA duplication.

In another possible implementation, after step S200e is performed, the first access network device determines, based on the second message, to establish the first PDU session and the second PDU session on the first access network device and the second access network device. In this implementation, the redundancy transmission may be provided for the first PDU session and the second PDU session by using DC duplication.

Using an example in which the second message carries an association indication, the first access network device may determine the 1st PDU session and the 2nd PDU session in the duplicated PDU sessions based on the association indication. For example, it may be determined that the first PDU session is the 1st PDU session in the duplicated PDU sessions and that the second PDU session is the 2nd PDU session in the duplicated PDU sessions. Therefore, the 1st PDU session may be established on the first access network device, and the 2nd PDU session may be established on the second access network device.

In this embodiment of this application, the second message may be a PDU session request (PDU session request) message, a PDU session resource establishment request (PDU session resource setup request) message, or the like.

Refer to Table 1, which shows a possible composition structure of the second message. Table 1 uses an example in which the second identifier is carried in the second message. Table 1 shows merely a part of information elements of the second message. The second message further includes other information elements in addition to the information elements shown in Table 1. Table 1 is merely used as an example of a possible second message but not a limitation.

TABLE 1

| Information element (Information Element, IE)/ group name (Group Name) | Presentation (presence) | Semantic description (Semantics description) |
| --- | --- | --- |
| >>PDU Session ID | M | |
| >>duplicated PDU session ID | | identifies a duplicated PDU session |

In Table 1, the PDU Session ID may be a first identifier, and the duplicated PDU session ID may be a second identifier. Using an example in which the second message is a PDU session resource establishment request message, the duplicated PDU session ID is newly added content. Optionally, an association indication may be further added to Table 1 and used to indicate that the first PDU session is associated with the second PDU session. For example, the association indication is used to indicate that a PDU session corresponding to the PDU session ID and a PDU session corresponding to the duplicated PDU session ID are used to transmit duplicated data packets. Optionally, a restrictive indication may be newly added to Table 1, and used to indicate a restrictive relationship by which the first PDU session can be established on a specified access network device and the second PDU session can be established on another specified access network device. For example, the restrictive indication may be used to indicate a restriction by which the PDU session corresponding to the PDU Session ID can be established on the first access network device alone, or can be established on the second access network device alone, or can be established and transmitted on either the first access network device or the second access network device.

In this embodiment of this application, the indication information may be implemented in different forms. For example, the indication information is implemented in an explicit form or an implicit form, as described below separately.

1. Explicit Implementation.

For example, if the first message explicitly indicates to suspend the first PDU session and/or the second PDU session, the first access network device may directly add the first information element to the first message, to indicate to suspend the first PDU session and/or the second PDU session.

In the first message, for example, the first information element may occupy one or more bits, and the first access network device uses the one or more bits to indicate whether to suspend the first PDU session and/or the second PDU session. Using an example in which the first information element occupies one bit, a value "0" of the bit may indicate that no suspending of the first PDU session and/or the second PDU session, and a value "1" of the bit may indicate suspending of the first PDU session and/or the second PDU session. Alternatively, using an example in which the first information element occupies one bit, a value "0" of the bit may indicate that suspending of the first PDU session and/or the second PDU session, and a value "1" of the bit may indicate no suspending of the first PDU session and/or the second PDU session. This application does not limit the specific indication manner. In an explicit implementation, the first information element is directly carried in the first message, so that the indication is clearer.

Refer to Table 2, which shows a possible composition structure of the first message according to an embodiment of this application. Using an example in which the first message carries a PDU session identifier (PDU session ID) and a first information element (suspend), the first information element is used to indicate to suspend the PDU session corresponding to the PDU session ID. The PDU session ID in Table 2 may include a first identifier and/or a second identifier. If the first message is a PDU session resource establishment response message, the first information element (suspend) in Table 2 is newly added content.

TABLE 2

| Information element (Information Element, IE)/ group name (Group Name) | Presentation (presence) | Semantic description (Semantics description) |
|---|---|---|
| >>PDU Session ID >>suspend (suspend) | M | indicates a need to suspend the PDU session corresponding to he PDU Session ID |

Refer to Table 3, which shows a possible composition structure of the first message according to an embodiment of this application. Using an example in which the first message carries a PDU session identifier (PDU session ID) and a first information element (reject), the first information element is used to indicate to temporarily reject the PDU session corresponding to the PDU session ID. The PDU session ID in Table 3 may include a first identifier and/or a second identifier. If the first message is a PDU session resource establishment response message, the first information element (reject) in Table 3 is newly added content. A location of the first information element (reject) in the PDU session resource establishment response message is not limited.

TABLE 3

| Information element (Information Element, IE)/ group name (Group Name) | Presentation (presence) | Semantic description (Semantics description) |
|---|---|---|
| >>PDU Session ID >>reject (reject) | M | indicates a need to temporarily reject the PDU session corresponding to the PDU Session ID |

For example, if a message that carries activation information explicitly indicates to activate the suspended first PDU session and/or second PDU session, the first access network device may directly add an indication information element into the message that carries the activation information, so that the indication information element is used to indicate to activate the first PDU session and/or the second PDU session.

For example, if a message that carries deactivation information explicitly indicates to deactivate the first PDU session and/or the second PDU session, the first access network device may directly add an indication information element into the message that carries the deactivation information, so that the indication information element is used to indicate to deactivate the first PDU session and/or the second PDU session.

2. Implicit Implementation.

For example, if the first message implicitly indicates to suspend the first PDU session and/or the second PDU session, the first message sent by the first access network device does not need to carry additional indication information, but the first message itself may be used as indication information.

For example, a protocol or a network device (the first access network device and the core network device) may pre-specify that, if the first message carries an identifier of the first PDU session and/or the second PDU session, then the first message is used to indicate to suspend the first PDU session and/or the second PDU session. By using implicit indication, the first access network device does not need to add content such as additional indication information into the message, thereby helping to save transmission resources.

For example, if a message carrying activation information implicitly indicates to activate the suspended first PDU session and/or second PDU session, the message carrying the activation information does not need to carry additional indication information, but the message itself may be used as indication information.

For example, if a message carrying deactivation information implicitly indicates to deactivate the first PDU session and/or second PDU session, the message carrying the deactivation information does not need to carry additional indication information, but the message itself may be used as indication information.

In this embodiment of this application, the core network device may further receive the deactivation information from the first access network device. Referring to step S205 in FIG. 6B, the deactivation information may be used to indicate to deactivate the first PDU session and/or the second PDU session. After receiving the deactivation information sent by the first access network device, the core network device may deactivate the first PDU session and/or the second PDU session based on the deactivation information. Refer to step S206 in FIG. 6B.

After the PDU session is deactivated, the PDU session is unavailable for transmitting a data packet. This may be understood as suspending the PDU session again.

In a possible implementation, after performing an activation process, the first access network device and the core network device may perform a deactivation process, that is, steps S205 to S206 in FIG. 6B.

In another possible implementation, the first access network device and the core network device may perform a deactivation process after performing a PDU session establishment process. For example, the terminal may be concurrently connected to two access network devices, and may separately establish PDU sessions by using the two access network devices.

In the foregoing two implementations, the first access network device may initiate a deactivation process when determining that one or more of the following deactivation conditions are met.

Deactivation condition 1: The first access network device determines that the terminal is disconnected from the second access network device.

Deactivation condition 2: The first access network device determines that channel quality of the second access network device is too poor to maintain DC.

Deactivation condition 3: The first access network device determines that a reliability transmission requirement is met by transmission of the data packet by using the first access network device alone.

Optionally, the deactivation information may include a first identifier and/or a second identifier. For example, if the deactivation information is used to deactivate the first PDU session and second PDU session, the deactivation information may include the first identifier and the second identifier. For another example, if the deactivation information is used to deactivate the suspended first PDU session, the deactivation information may include the first identifier. For still another example, if the deactivation information is used to deactivate the suspended second PDU session, the deactivation information may include the second identifier.

Optionally, the deactivation information may further include an indication information element. The indication information element may indicate to deactivate the first PDU session and/or the second PDU session.

In a possible implementation, after receiving the deactivation information sent by the first access network device, the core network device may further send an acknowledgment message to the first access network device, to acknowledge that the deactivation information is received.

The following describes, by using an example, a communication method according to an embodiment of this application with reference to FIG. 7A, FIG. 7B, FIG. 8A, and FIG. 8B.

Figure 7A:
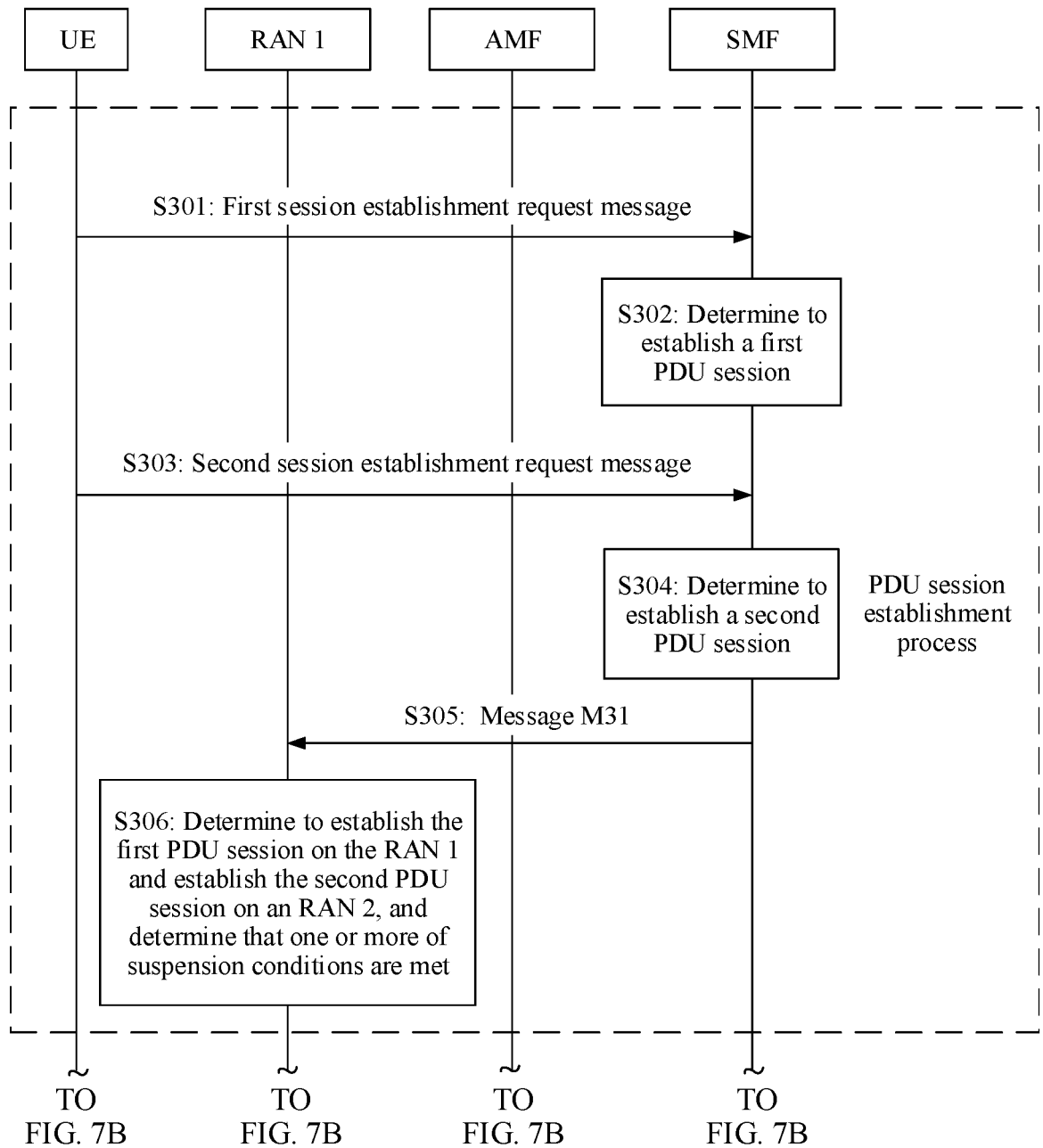
FIG. 7A and FIG. 7B are a schematic flowchart of still another communication method according to an embodiment of this application.
Figure 7B:
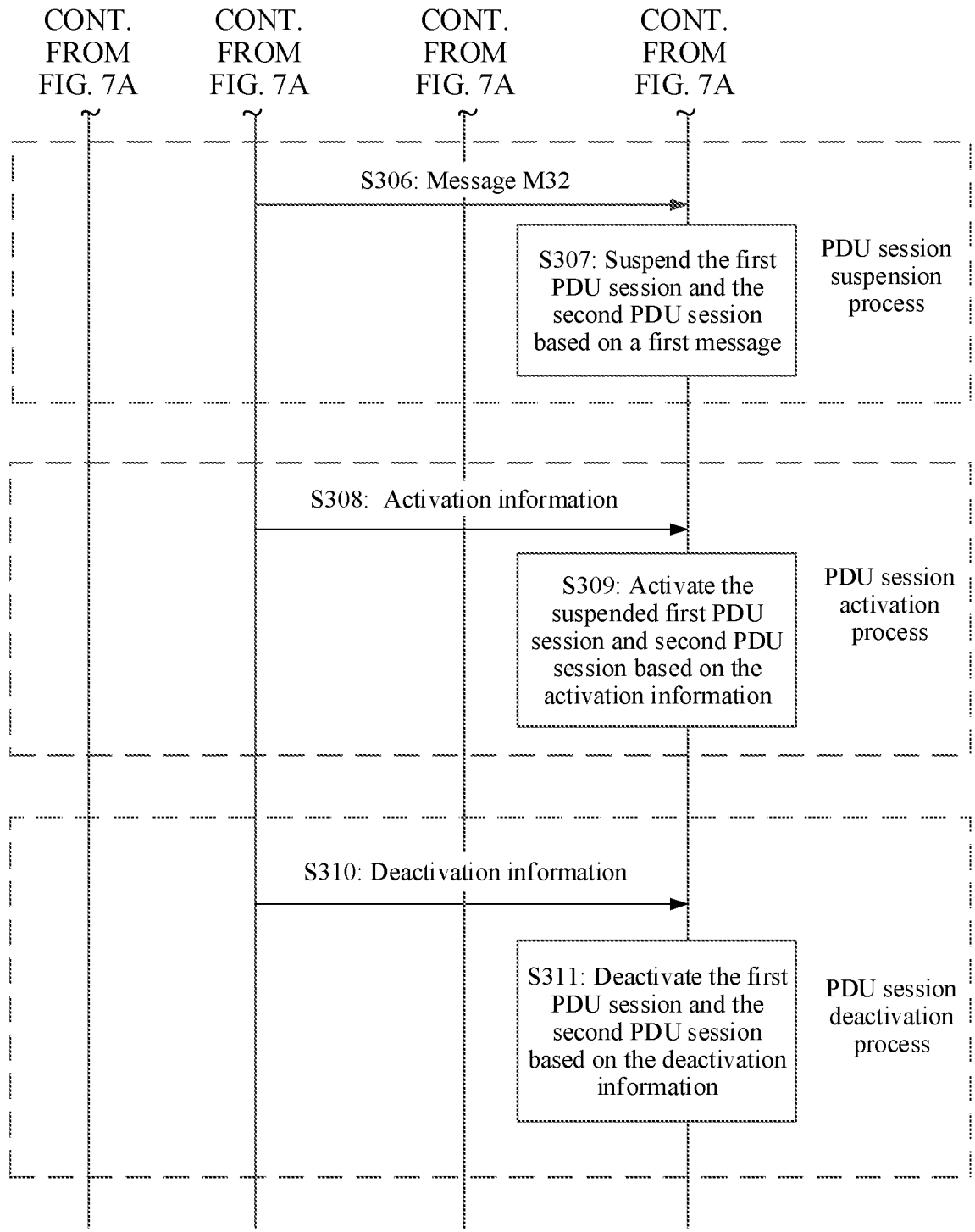

Refer to FIG. 7A and FIG. 7B, which are implementation flowcharts of another communication method according to an embodiment of this application. FIG. 7A and FIG. 7B illustrate an example in which a terminal is UE, a first access network device is a RAN 1, a second access network device is a RAN 2, and a core network device is an SMF. Referring to FIG. 7A and FIG. 7B, the method includes the following steps.

S301: An SMF receives a first session establishment request message from UE. The first session establishment request message includes a first identifier. The first session establishment request message is used to request to establish a first PDU session.

The SMF may receive, by using a RAN 1 and an AMF, the first session establishment request message sent by the UE. For example, after receiving the first session establishment request message sent by the UE, the RAN 1 forwards the first session establishment request message to the AMF. The AMF forwards the first session establishment request message to the SMF after processing the message (for example, adding some identification information into the message).

S302: The SMF determines, based on the first session establishment request message sent by the UE, to establish the first PDU session.

S303: The SMF receives a second session establishment request message from the UE. The second session establishment request message includes a second identifier. The second session establishment request message is used to request to establish a second PDU session.

Similarly, the SMF may also receive, by using the RAN 1 and the AMF, the second session establishment request message sent by the UE. For a detailed process, refer to step S301, details of which are omitted here.

S304: The SMF determines, based on the second session establishment request message sent by the UE, to establish the second PDU session.

S305: After determining to establish the first PDU session and the second PDU session, the SMF may send a message M31 to the RAN 1. The message M31 includes a first identifier and a second identifier, and the message M31 is used to request to establish the first PDU session and the second PDU session. For content that may be carried in the message M31 and a meaning of the message M31, refer to the description of the second message in FIG. 6A, details of which are omitted here.

The SMF may send the message M31 to the RAN 1 by using the AMF.

This example is described below assuming that the message M31 carries an association indication and the association indication includes a first association identifier and a second association identifier.

S306: After receiving the message M31, the RAN 1 may determine, based on the first association identifier carried in the message M31, that the first PDU session is the 1st PDU session in the duplicated PDU sessions, and may determine, based on the second association identifier, that the second PDU session is the 2nd PDU session in the duplicated PDU sessions, so as to determine to establish the first PDU session on the RAN 1 and establish the second PDU session on the RAN 2. In this case, if determining that one or more of the suspension conditions are met, the RAN 1 sends a message M32 to the SMF. This example is described assuming that the message M32 is used to indicate to suspend the first PDU session and the second PDU session.

The RAN 1 may alternatively determine to establish the second PDU session on the RAN 1 and establish the first PDU session on the RAN 2. This is not limited in this application.

S307: After receiving the message M32 sent by the RAN 1, the SMF suspends the first PDU session and the second PDU session based on the message M32.

In this way, when the RAN 1 is not ready to establish the DC, or, as understood in a different way, when there is no RAN 2 that can establish the second PDU session, the RAN 1 may initiate a session suspension process, for example, steps S306 to S307 in FIG. 7B. In this way, after receiving the message M32 sent by the RAN 1, the SMF suspends the first PDU session and the second PDU session. In other words, the SMF temporarily does not release resources for establishing the first PDU session and the second PDU session, and may indicate, when the RAN 1 is subsequently ready to establish the DC, the SMF to activate the suspended PDU session. In this way, a PDU session does not need to be re-established, and signaling overheads for establishing the PDU session are saved.

In this example, after initiating the session suspension process, the RAN 1 may further initiate a session activation process toward the SMF if the RAN 1 determines that one or more of the activation conditions are met. Refer to steps S308 to S309 in FIG. 7B.

S308: The RAN 1 sends activation information to the SMF. This example is described assuming that the activation information is used to activate the suspended first PDU session and second PDU session. The RAN 1 may send the activation information to the SMF by using the AMF.

S309: The SMF may activate the suspended first PDU session and second PDU session based on the activation information.

In this example, after initiating the session activation process, the RAN 1 may further initiate a session deactivation process toward the SMF if the RAN 1 determines that one or more of the deactivation conditions are met. Refer to steps S310 to S311 in FIG. 7B.

S310: The SMF receives deactivation information from the RAN 1. This example is described assuming that the deactivation information is used to indicate to deactivate the first PDU session and the second PDU session.

S311: After receiving the deactivation information sent by the RAN 1, the SMF may deactivate the first PDU session and the second PDU session based on the deactivation information.

Figure 8A:
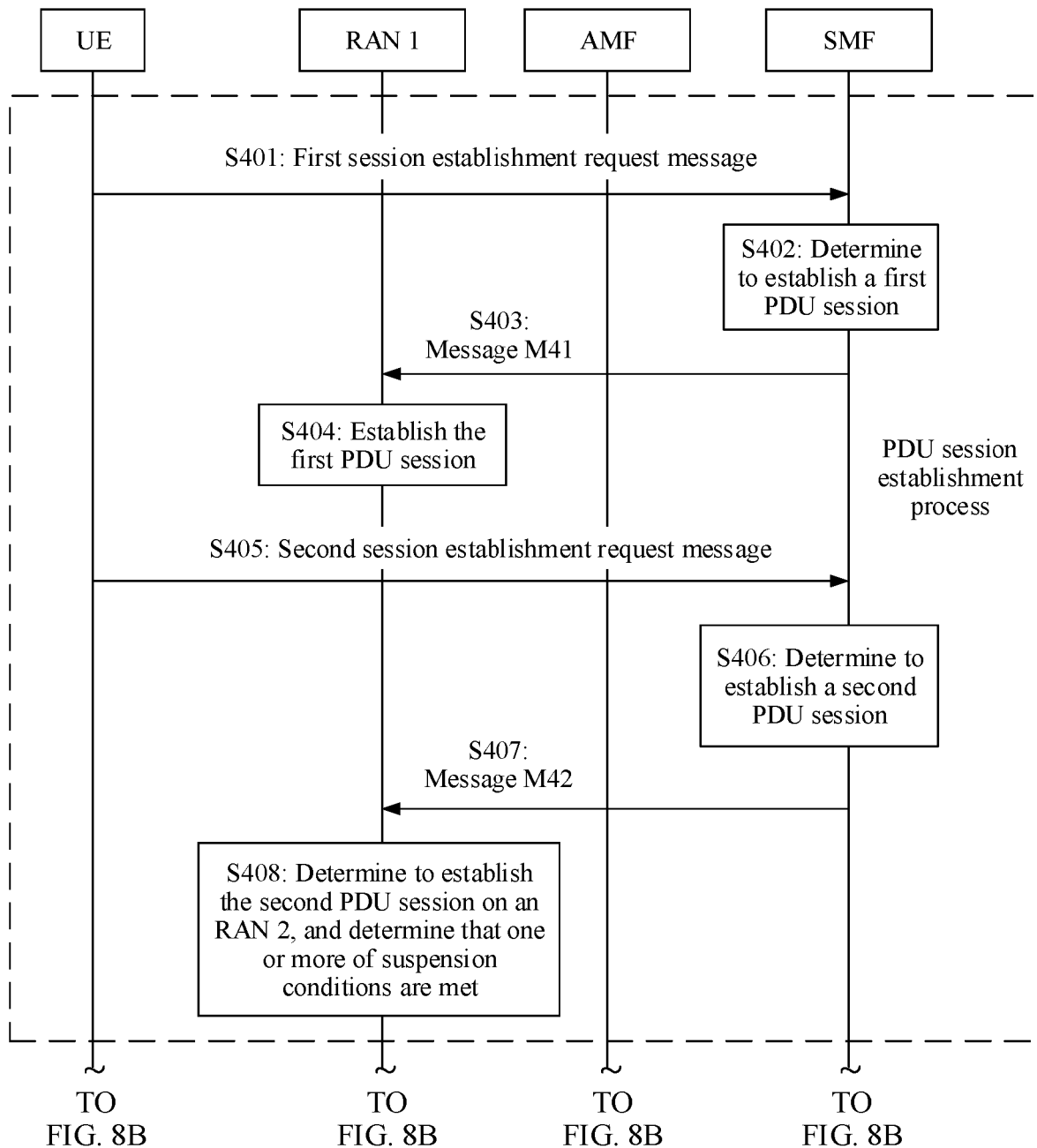
FIG. 8A and FIG. 8B are a schematic flowchart of still another communication method according to an embodiment of this application.
Figure 8B:
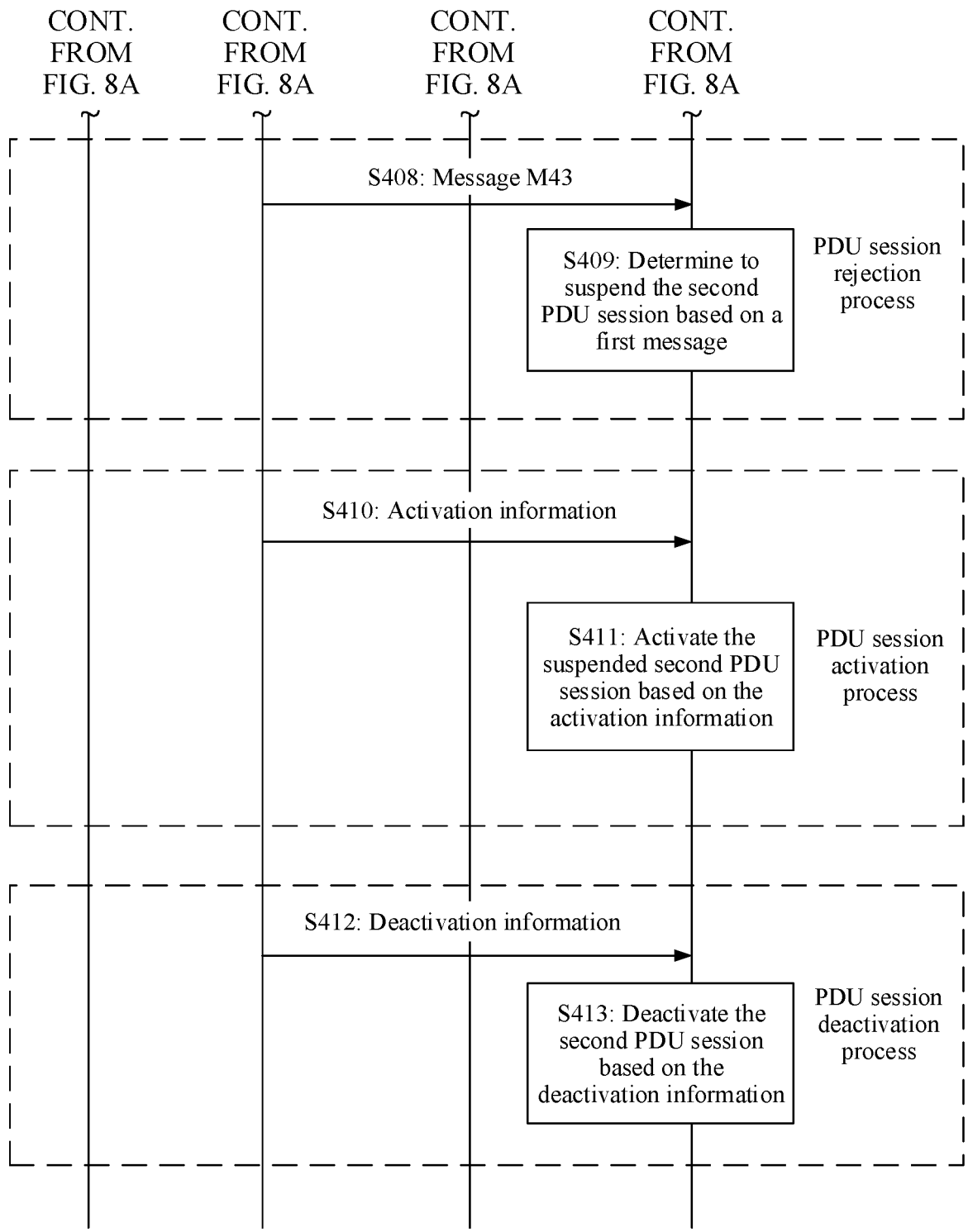

Refer to FIG. 8A and FIG. 8B, which are implementation flowcharts of another communication method according to an embodiment of this application. FIG. 8A and FIG. 8B illustrate an example in which a terminal is UE, a first access network device is a RAN 1, a second access network device is a RAN 2, and a core network device is an SMF. Referring to FIG. 8A and FIG. 8B, the method includes the following steps.

S401: An SMF receives a first session establishment request message from UE by using a RAN 1. The first session establishment request message includes a first identifier, and the first session establishment request message is used to request to establish a first PDU session.

S402: The SMF determines, based on the first session establishment request message sent by the UE, to establish the first PDU session.

For steps S401 to S402 in this example, refer to steps S301 to S302 in the example shown in FIG. 7A, details of which are omitted here.

S403: After determining to establish the first PDU session, the SMF may send a message M41 to the RAN 1. The message M41 carries the first identifier. The message M41 is used to request to establish the first PDU session.

Optionally, the message M41 may further carry a first indication, used to indicate that the first PDU session identified by the first identifier is the 1st PDU session in duplicated PDU sessions.

S404: The RAN 1 completes establishment of the first PDU session based on the message M41.

In this example, the first PDU session and the second PDU session are established separately. In this way, after the establishment of the first PDU session is completed, a data packet may be transmitted between the UE and the SMF by using the first PDU session.

S405: The SMF receives a second session establishment request message from the UE by using the RAN 1. The second session establishment request message includes a second identifier. The second session establishment request message is used to request to establish a second PDU session.

S406: The SMF determines, based on the second session establishment request message sent by the UE, to establish the second PDU session.

For steps S405 to S406 in this example, refer to steps S303 to S304 in the example shown in FIG. 7A, details of which are omitted here.

S407: After determining to establish the second PDU session, the SMF may send a message M42 to the RAN 1. The message M42 carries the second identifier. The message M42 is used to request to establish the second PDU session.

Optionally, the message M42 may further carry a second indication, used to indicate that the second PDU session identified by the second identifier is the 2nd PDU session in the duplicated PDU sessions.

S408: The RAN 1 determines to establish the second PDU session on a RAN 2. In this case, if determining that one or more of temporary rejection conditions are met, the RAN 1 sends a message M43 to the SMF. This example is described assuming that the message M43 is used to indicate to temporarily reject the second PDU session.

S409: After receiving the message M43 sent by the RAN 1, the SMF determines, based on the message M43, to suspend the second PDU session.

In this way, when the RAN 1 is not ready to establish the DC, that is, when there is no RAN 2 that can establish the second PDU session, the RAN 1 may temporarily reject establishment of the second PDU session. In this case, the first PDU session already established is not affected. In other words, in this case, a data packet can still be transmitted between the UE, the RAN 1, and the SMF by using the first PDU session. After receiving the message M43 sent by the RAN 1, the SMF temporarily skips releasing a resource for establishing the second PDU session, and may indicate, when the RAN 1 is subsequently ready to establish the DC, the SMF to activate the suspended second PDU session. In this way, a PDU session does not need to be re-established, and signaling overheads for establishing the PDU session are saved.

S410: The RAN 1 sends activation information to the SMF. In this example, it is assumed that the second PDU session is temporarily rejected, and therefore, the activation information is used to activate the suspended second PDU session. The RAN 1 may send the activation information to the SMF by using the AMF.

S411: The SMF may activate the suspended second PDU session based on the activation information.

In this example, after initiating the session activation process, the RAN 1 may further initiate a session deactivation process toward the SMF if the RAN 1 determines that one or more of the deactivation conditions are met.

For example, it is assumed that, after the activated second PDU session transmits data packets for a period, channel quality of the RAN 2 used to establish the second PDU session becomes so poor that the UE is disconnected from the RAN 2. In this case, the RAN 1 may initiate a deactivation process for the second PDU session. Refer to steps S412 to S413 in FIG. 8B.

S412: The SMF receives deactivation information from the RAN 1. This example is described assuming that the deactivation information is used to indicate to deactivate the second PDU session.

S413: After receiving the deactivation information sent by the RAN 1, the SMF may deactivate the second PDU session based on the deactivation information.

The foregoing primarily describes the solutions provided in the embodiments of this application from a perspective of interaction between the first access network device and the core network device. Understandably, to implement the foregoing functions, the first access network device and the core network device include hardware structures and/or software modules for performing the corresponding functions. With reference to the units and algorithm steps described in the embodiments disclosed in this application, embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In this embodiment of this application, functional units of the first access network device and the core network device may be divided based on the foregoing method examples. For example, the functional units may be divided in such a way that each functional unit corresponds to a specific function, or two or more functions may be integrated into one processing unit. The integrated unit may be implemented in a form of hardware, or may be implemented in a form of a software functional unit.

Based on a same inventive concept, the embodiments of this application further provide an apparatus configured to implement any one of the foregoing methods. For example, an apparatus is provided, and includes units (or means) configured to implement the steps performed by the first access network device in any one of the foregoing methods. For another example, another apparatus is further provided, and includes units (or means) configured to implement the steps performed by the core network device in any one of the foregoing methods.

Figure 9:
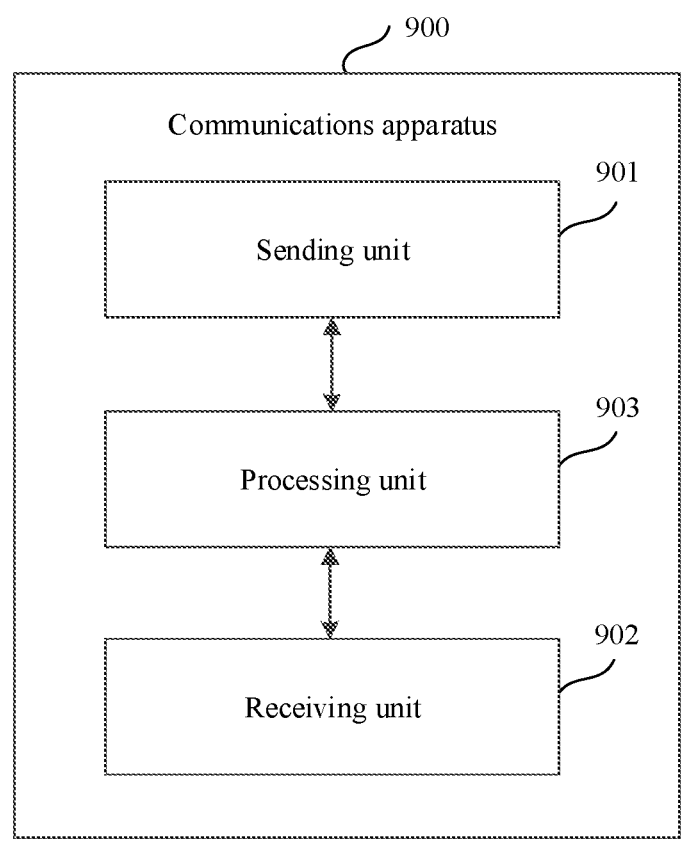
FIG. 9 is a schematic structural diagram of a communications apparatus according to an embodiment of this application.

In a possible implementation, an embodiment of this application provides a communications apparatus 900. The communications apparatus 900 may be used in a first access network device. FIG. 9 is a schematic structural diagram of the communications apparatus 900 according to the embodiment of this application. Referring to FIG. 9, the communications apparatus 900 may include a sending unit 901. In an implementation, the communications apparatus 900 may further include a receiving unit 902 and a processing unit 903.

According to the communication method shown in FIG. 5, the sending unit 901 in the communications apparatus 900 shown in FIG. 9 may be configured for the communications apparatus 900 to perform the step shown in S101 or S103.

Figure 10:
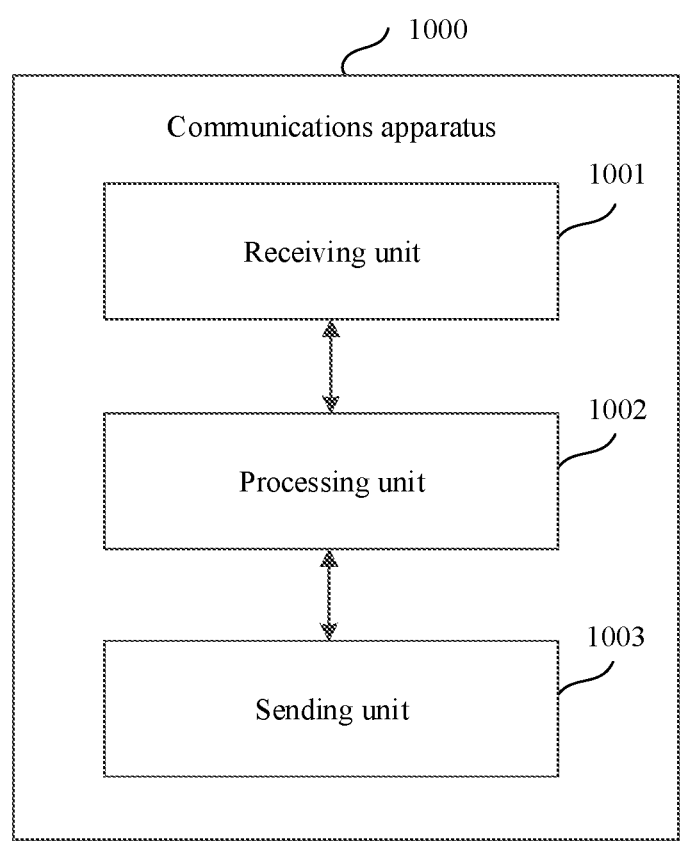
FIG. 10 is a schematic structural diagram of another communications apparatus according to an embodiment of this application.

In another possible implementation, an embodiment of this application provides a communications apparatus 1000. The communications apparatus 1000 may be used in a core network device. FIG. 10 is a schematic structural diagram of the communications apparatus 1000 according to the embodiment of this application. Referring to FIG. 10, the communications apparatus 1000 may include a receiving unit 1001 and a processing unit 1002. In an implementation, the communications apparatus 1000 may further include a sending unit 1003.

According to the communication method shown in FIG. 5, the receiving unit 1001 in the communications apparatus 1000 shown in FIG. 10 may be configured for the communications apparatus 1000 to perform the step shown in S101 or S103, and the processing unit 1002 in the communications apparatus 1000 may be configured for the communications apparatus 1000 to perform the step shown in S102.

When the communications apparatus 900 is used in the first access network device, and the communications apparatus 1000 is used in the core network device, the following operations may be further performed.

In a possible design, the receiving unit 902 is configured to: before the sending unit 901 sends a first message to the core network device, receive a second message from the core network device. The second message includes a first identifier used to identify a first PDU session and a second identifier used to identify a second PDU session, and the second message is used to request to establish the first PDU session and the second PDU session. According to this method, a PDU session does not need to be re-established, and signaling overheads for establishing the PDU session are saved.

In another possible design, after the receiving unit 1001 receives activation information from the first access network device, the processing unit 1002 is further configured to activate a suspended PDU session based on the activation information.

In still another possible design, the receiving unit 1001 is further configured to:

before receiving the first message from the first access network device, receive a first session establishment request message from a terminal, where the first session establishment request message includes the first identifier used to identify the first PDU session, and the first session establishment request message is used to request to establish the first PDU session.

The processing unit 1002 is further configured to determine, based on the first session establishment request message, to establish the first PDU session.

The receiving unit 1001 is further configured to receive, from the terminal, the second identifier used to identify the second PDU session.

The processing unit 1002 is further configured to determine, based on the second identifier, to establish the second PDU session.

The sending unit 1003 is configured to send the second message to the first access network device. The second message includes the first identifier and the second identifier, and the second message is used to request to establish the first PDU session and the second PDU session.

A message carrying the second identifier and sent to the communications apparatus 1000 is not limited in this embodiment of this application. In a possible design, the first session establishment request message further includes the second identifier. In another possible design, the second identifier is carried in a second session establishment request message, and the second session establishment request message is used to request to establish the second PDU session.

In still another possible design, the second message further includes an association indication. The association indication is used to indicate that the first PDU session is associated with the second PDU session.

In still another possible design, the processing unit 903 is configured to: determine, based on the second message, to establish the first PDU session on the apparatus, and establish the second PDU session on a second access network device.

That the sending unit 901 sends a first message to the core network device specifically includes:

when the processing unit 903 determines that there is no second access network device that can establish the second PDU session, sending the first message to the core network device.

In still another possible design, that the sending unit 901 sends the activation information to the core network device specifically includes:

when the processing unit 903 determines that there is a second access network device that can establish the second PDU session, sending the activation information to the core network device.

In still another possible design, the sending unit 901 is further configured to:

send deactivation information to the core network device, where the deactivation information is used to indicate to deactivate the first PDU session and/or the second PDU session.

In still another possible design, after the receiving unit 1001 receives the deactivation information from the first access network device, the processing unit 1002 is further configured to deactivate the first PDU session and/or the second PDU session based on the deactivation information.

In still another possible design, the deactivation information includes the first identifier and/or the second identifier.

In still another possible design, the deactivation information includes an indication information element. The indication information element is used to indicate to deactivate the first PDU session and/or the second PDU session.

In still another possible design, the first message includes a first information element and/or a second information element. The first information element is used to indicate to suspend the first PDU session and/or the second PDU session. The second information element is used to indicate a suspension cause.

In still another possible design, the activation information includes the first identifier and/or the second identifier.

In still another possible design, the activation information includes an indication information element. The indication information element is used to indicate to activate the first PDU session and/or the second PDU session.

It should be understood that division into the units in the foregoing apparatuses is merely logical function division. In an actual implementation, all or some of the units may be integrated into a physical entity, or may be physically separate. In addition, all the units in the apparatuses may be implemented in a form of software invoked by a processing element, or all may be implemented in a form of hardware; or some units may be implemented in a form of software invoked by a processing element, and some units may be implemented in a form of hardware. For example, each unit may be an independently disposed processing element, or may be integrated into a chip of the apparatuses for implementation. Alternatively, each unit may be stored in a memory in a form of a program to be invoked by a processing element of the apparatuses to perform a function of the unit. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented by using a hardware integrated logic circuit of the processing element, or may be implemented in a form of software invoked by the processing element.

In an example, a unit in any one of the foregoing apparatuses may be one or more integrated circuits configured to implement the foregoing methods, for example, one or more application-specific integrated circuits (ASIC), one or more microprocessors (DSP), one or more field programmable gate arrays (FPGA), or a combination of at least two of these types of integrated circuits. For another example, when a unit in the apparatuses is implemented in a form of a program invoked by a processing element, the processing element may be a general-purpose processor, for example, a central processing unit (CPU) or another processor that can invoke a program. For another example, the units may be integrated together and implemented in a form of a system-on-a-chip (SOC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 11:
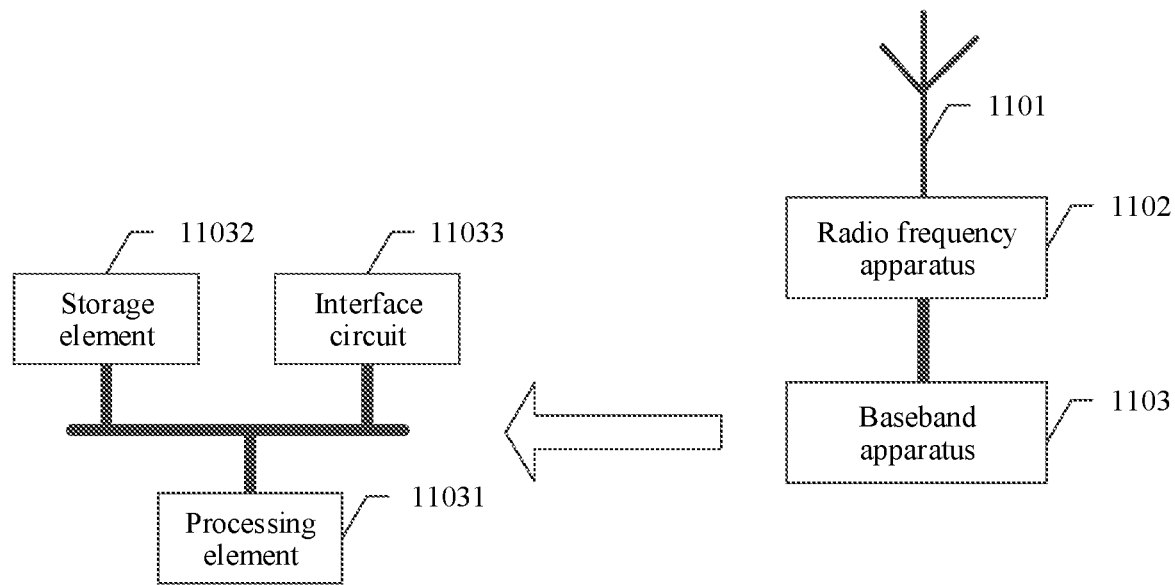
FIG. 11 is a schematic structural diagram of another communications apparatus according to an embodiment of this application.

FIG. 11 is a schematic structural diagram of a first access network device according to an embodiment of this application. The first access network device is configured to implement operations of the first access network device in the foregoing embodiments. As shown in FIG. 11, the first access network device includes an antenna 1101, a radio frequency apparatus 1102, and a baseband apparatus 1103. The antenna 1101 is connected to the radio frequency apparatus 1102. In an uplink direction, the radio frequency apparatus 1102 receives, by using the antenna 1101, information sent by a terminal, and sends, to the baseband apparatus 1103 for processing, the information sent by the terminal. In a downlink direction, the baseband apparatus 1103 processes the information from the terminal, and sends the information to the radio frequency apparatus 1102. The radio frequency apparatus 1102 processes the information from the terminal, and then sends processed information to the terminal by using the antenna 1101.

The baseband apparatus 1103 may include one or more processing elements 11031, for example, include one main control CPU and another integrated circuit. In addition, the baseband apparatus 1103 may further include a storage element 11032 and an interface circuit 11033. The storage element 11032 is configured to store a program and data. The interface circuit 11033 is configured to exchange information with the radio frequency apparatus 1102, and the interface circuit is, for example, a common public radio interface (CPRI). The foregoing apparatus used in the first access network device may be located in the baseband apparatus 1103. For example, the foregoing apparatus used in the first access network device may be a chip on the baseband apparatus 1103. The chip includes at least one processing element and an interface circuit. The processing element is configured to perform the steps of any one of the methods performed by the first access network device. The interface circuit is configured to communicate with another apparatus. In an implementation, units of the first access network device that implement the steps in the foregoing methods may be implemented in a form of a program invoked by a processing element. For example, the apparatus used in the first access network device includes a processing element and a storage element. The processing element invokes a program stored in the storage element, to perform the methods performed by the first access network device in the foregoing method embodiments. The storage element may be a storage element located on a same chip as the processing element, that is, an on-chip storage element, or may be a storage element located on a different chip from the processing element, that is, an off-chip storage element.

In another implementation, units of the apparatus used in the first access network device that implement the steps in the foregoing methods may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the first access network device that implement the steps in the foregoing methods may be integrated together, and implemented in a form of a system-on-a-chip (SOC). For example, the baseband apparatus includes the SOC chip, configured to implement the foregoing methods. At least one processing element and a storage element may be integrated into the chip, and the processing element invokes the program stored in the storage element to implement the foregoing methods performed by the first access network device. Alternatively, at least one integrated circuit may be integrated into the chip, to implement the foregoing methods performed by the first access network device. Alternatively, with reference to the foregoing implementations, functions of some units may be implemented in a form of a program invoked by the processing unit, and functions of some units may be implemented by using the integrated circuit.

It can be learned that the foregoing apparatus used in the first access network device may include at least one processing element and an interface circuit. The at least one processing element is configured to perform any one of the methods performed by the first access network device provided in the foregoing method embodiments. The processing element may perform, in a first manner, to be specific, by invoking the program stored in the storage element, some or all steps performed by the first access network device; or may perform, in a second manner, to be specific, by using a hardware integrated logic circuit in the processing element in combination with an instruction, some or all steps performed by the first access network device; or may certainly perform, by combining the first manner and the second manner, some or all steps performed by the first access network device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be one memory, or may be a general term of a plurality of storage elements.

Figure 12:
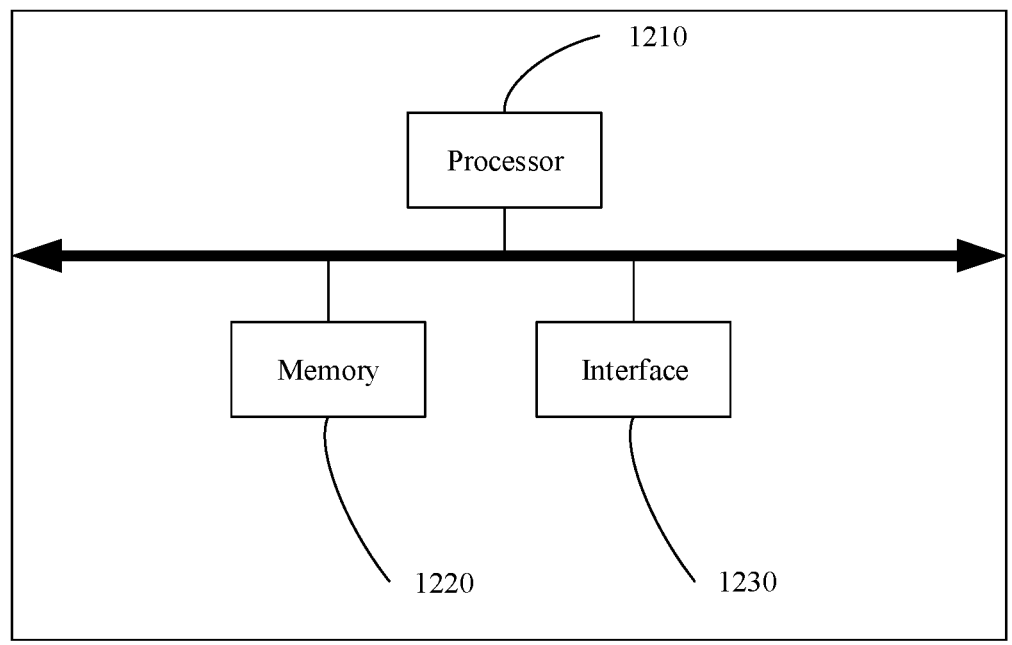
FIG. 12 is a schematic structural diagram of another communications apparatus according to an embodiment of this application.

FIG. 12 is a schematic structural diagram of a core network device according to an embodiment of this application. The core network device may be the core network device in the foregoing embodiments and is configured to implement operations of the core network device in the foregoing embodiments.

As shown in FIG. 12, the core network device includes a processor 1210, a memory 1220, and an interface 1230. The processor 1210, the memory 1220, and the interface 1230 are connected to each other by using a signal.

The communications apparatus 1000 is located in the core network device, and a function of each unit may be implemented by the processor 1210 by invoking a program stored in the memory 1220. That is, the foregoing communications apparatus 1000 may include a memory and a processor. The memory is configured to store a program, and the program is invoked by the processor to perform the methods in the foregoing method embodiments. The processor herein may be an integrated circuit having a signal processing capability, for example, a CPU. Alternatively, functions of the foregoing units may be implemented by one or more integrated circuits configured to implement the foregoing methods, for example, one or more ASICs, one or more microprocessors DSPs, one or more FPGAs, or a combination of at least two of the integrated circuits. Alternatively, the foregoing implementations may be combined.

According to the methods provided in the embodiments of this application, an embodiment of this application further provides a communications system. The system includes the foregoing first access network device, second access network device, core network device, and terminal.

An embodiment of this application further provides a communications apparatus, used in a first access network device or a core network device, and including at least one processing element (or chip) configured to perform the foregoing method embodiments.

This application provides a communication program. When the program is executed by a processor, the processor is configured to perform the methods in the foregoing embodiments.

This application further provides a program product, for example, a computer-readable storage medium, including the program in the foregoing communication methods.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded on a computer or another programmable data processing device, so that a series of operation steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some possible embodiments of this application have been described, a person skilled in the art can make changes and modifications to these embodiments once learning the basic inventive concept. Therefore, the following claims are intended to be construed as to cover the embodiments of this application and all changes and modifications falling within the scope of this application.

A person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:
receiving, by a first access network device, a message from a core network device, wherein the message comprises an association indication, the association indication indicates that a first protocol data unit (PDU) session is associated with a second PDU session, the first PDU session and the second PDU session are used to transmit a duplicated data packet, and the message comprises a first identifier used to identify the first PDU session and a second identifier used to identify the second PDU session; and determining, by the first access network device based on the message, to establish the first PDU session on the first access network device, and to establish the second PDU session on a second access network device.

2. The method according to claim 1, wherein the association indication comprises a first association identifier and a second association identifier, the first association identifier indicates that the first PDU session is the a 1st PDU session in duplicated PDU sessions, and the second association identifier indicates that the second PDU session is a 2nd PDU session in the duplicated PDU sessions.

3. The method according to claim 1, wherein the message is a PDU session resource establishment request message.

4. A communication method, comprising:
receiving, by a core network device, a first session establishment request message and a second session establishment request message from a terminal;
determining, by the core network device based on the first session establishment request message and the second session establishment request message, to establish a first protocol data unit (PDU) session and a second PDU session, wherein the first PDU session and the second PDU session are used to transmit a duplicated data packet;
sending, by the core network device, an association indication to an access network device, wherein the association indication indicates that the first PDU session is associated with the second PDU session; and
sending, by the core network device, a first identifier used to identify the first PDU session and a second identifier used to identify the second PDU session to the access network device.

5. The method according to claim 4, wherein the association indication comprises a first association identifier and a second association identifier, the first association identifier indicates that the first PDU session is a 1st PDU session in duplicated PDU sessions, and the second association identifier indicates that the second PDU session is a 2nd PDU session in the duplicated PDU sessions.

6. The method according to claim 4, wherein the association indication is carried in a PDU session resource establishment request message.

7. A communications apparatus, comprising a processor and a memory storing instructions that when executed by the processor configure the communications apparatus to:
receive a message from a core network device, wherein the message comprises an association indication, the association indication indicates that a first protocol data unit (PDU) session is associated with a second PDU session, the first PDU session and the second PDU session are used to transmit a duplicated data packet, and the message comprises a first identifier used to identify the first PDU session and a second identifier used to identify the second PDU session; and
determine, based on the message, to establish the first PDU session on the communications apparatus, and to establish the second PDU session on a second access network device.

8. The communications apparatus according to claim 7, wherein the association indication comprises a first association identifier and a second association identifier, the first association identifier indicates that the first PDU session is a 1st PDU session in duplicated PDU sessions, and the second association identifier indicates that the second PDU session is a 2nd PDU session in the duplicated PDU sessions.

9. The communications apparatus according to claim 7, wherein the message is a PDU session resource establishment request message.

10. A communications apparatus, comprising a processor, wherein the processor and a memory storing instructions that when executed by the processor configure the communications apparatus to:
receive a first session establishment request message and a second session establishment request message from a terminal;
determine based on the first session establishment request message and the second session establishment request message, to establish a first protocol data unit (PDU) session and a second PDU session, wherein the first PDU session and the second PDU session are used to transmit a duplicated data packet;
send an association indication to an access network device, wherein the association indication indicates that the first PDU session is associated with the second PDU session; and
send a first identifier used to identify the first PDU session and a second identifier used to identify the second PDU session to the access network device.

11. The communications apparatus according to claim 10, wherein the association indication comprises a first association identifier and a second association identifier, the first association identifier indicates that the first PDU session is a 1st PDU session in duplicated PDU sessions, and the second association identifier indicates that the second PDU session is a 2nd PDU session in the duplicated PDU sessions.

12. The communications apparatus according to claim 10, wherein the association indication is carried in a PDU session resource establishment request message.

* * * * *